Nov. 24, 1936.  H. A. S. HOWARTH  2,061,966
BEARING
Filed July 30, 1932  6 Sheets-Sheet 1
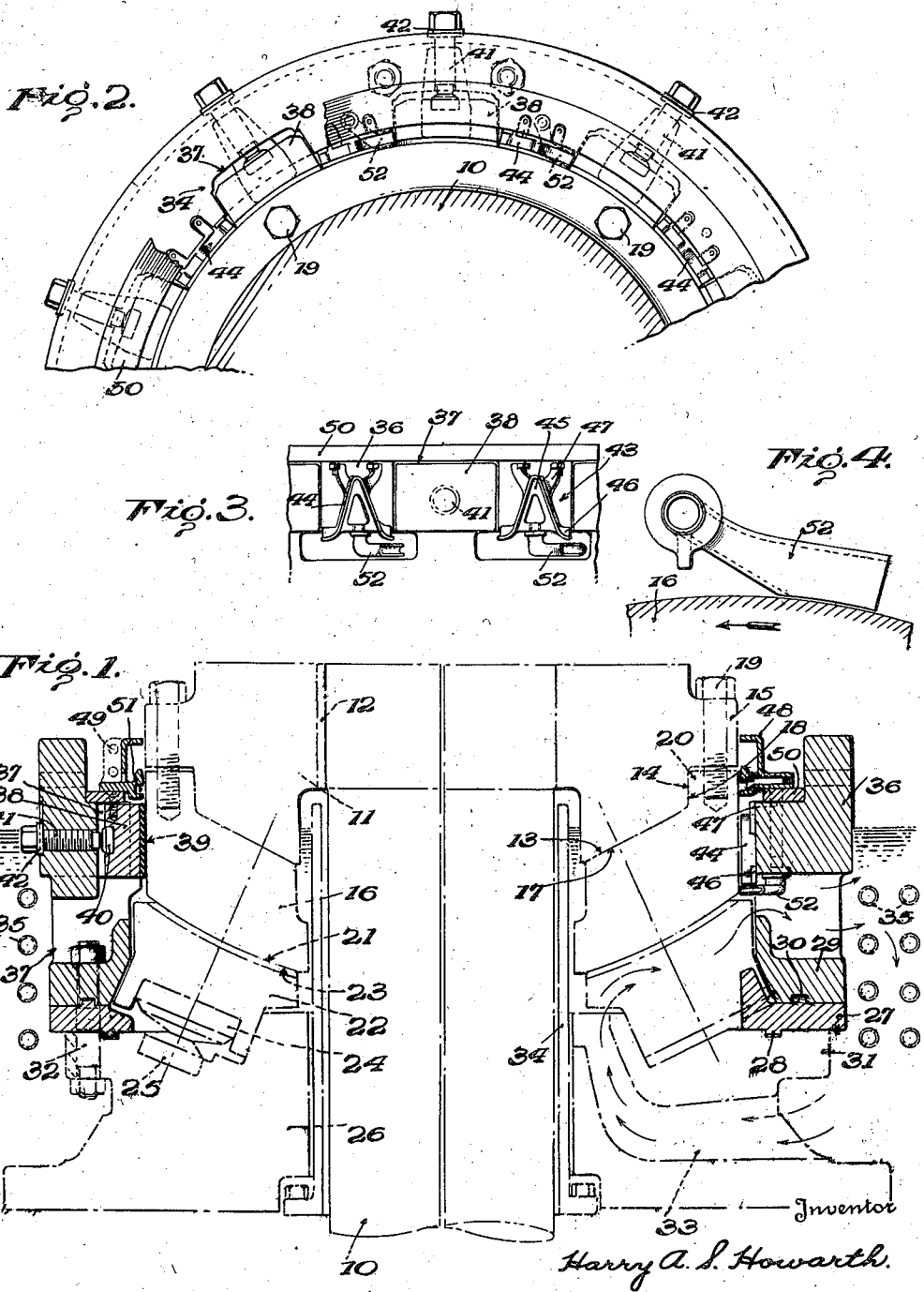
Inventor
Harry A. S. Howarth.
By Cameron, Kerkam + Sutton.
Attorneys

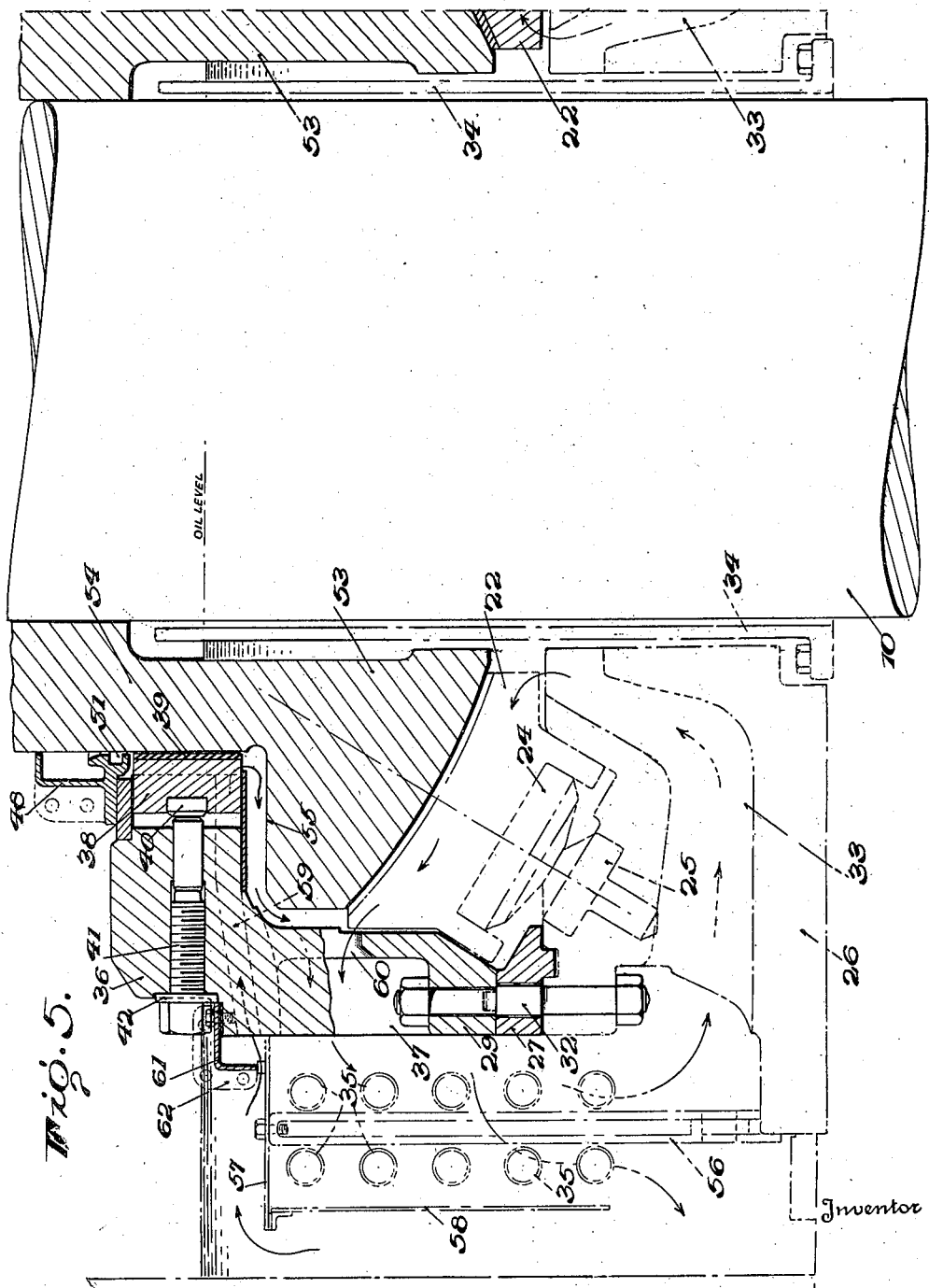

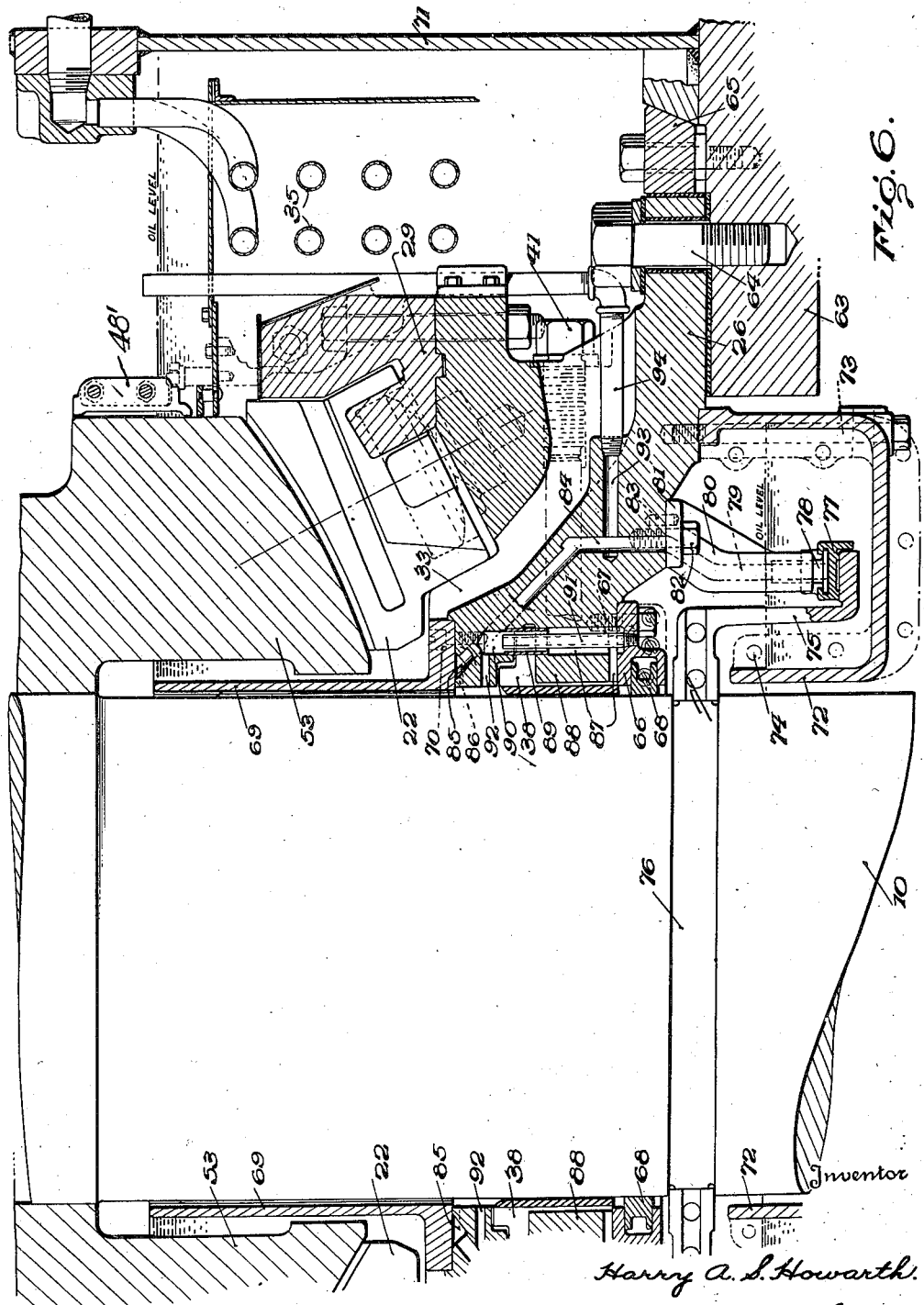

Nov. 24, 1936.  H. A. S. HOWARTH  2,061,966
BEARING
Filed July 30, 1932   6 Sheets-Sheet 4
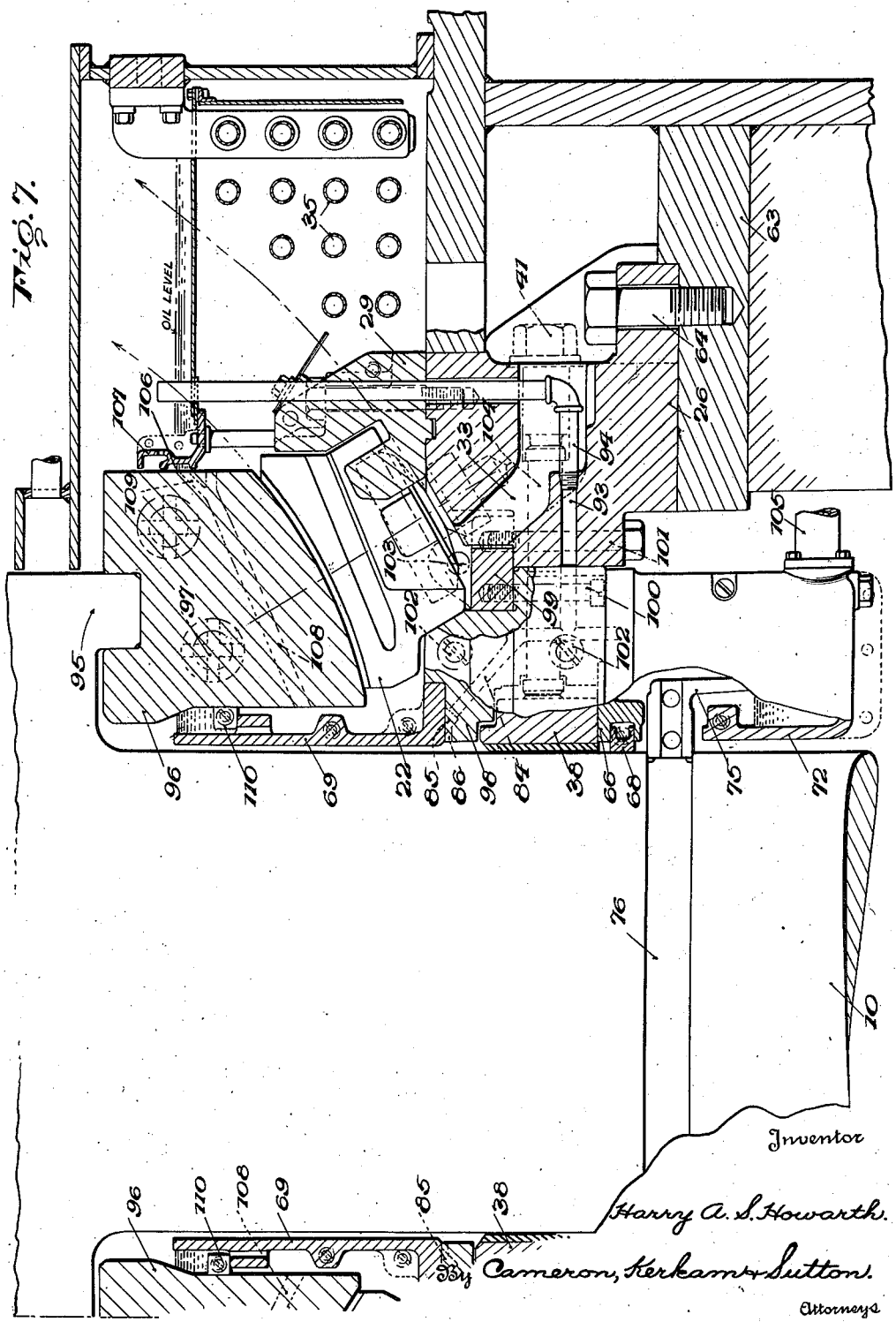
Inventor
Harry A. S. Howarth.
By Cameron, Kerkam & Sutton.
Attorneys

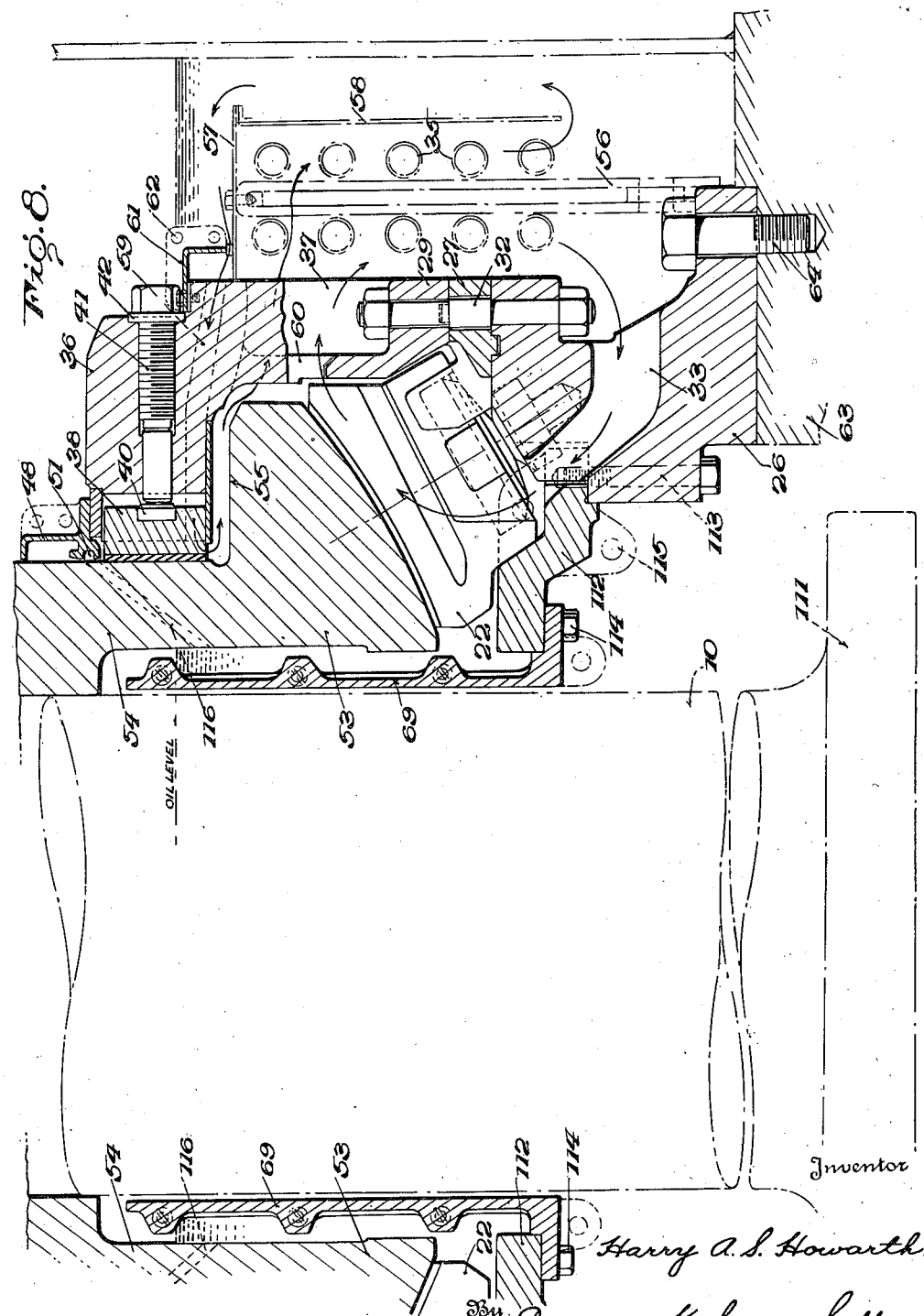

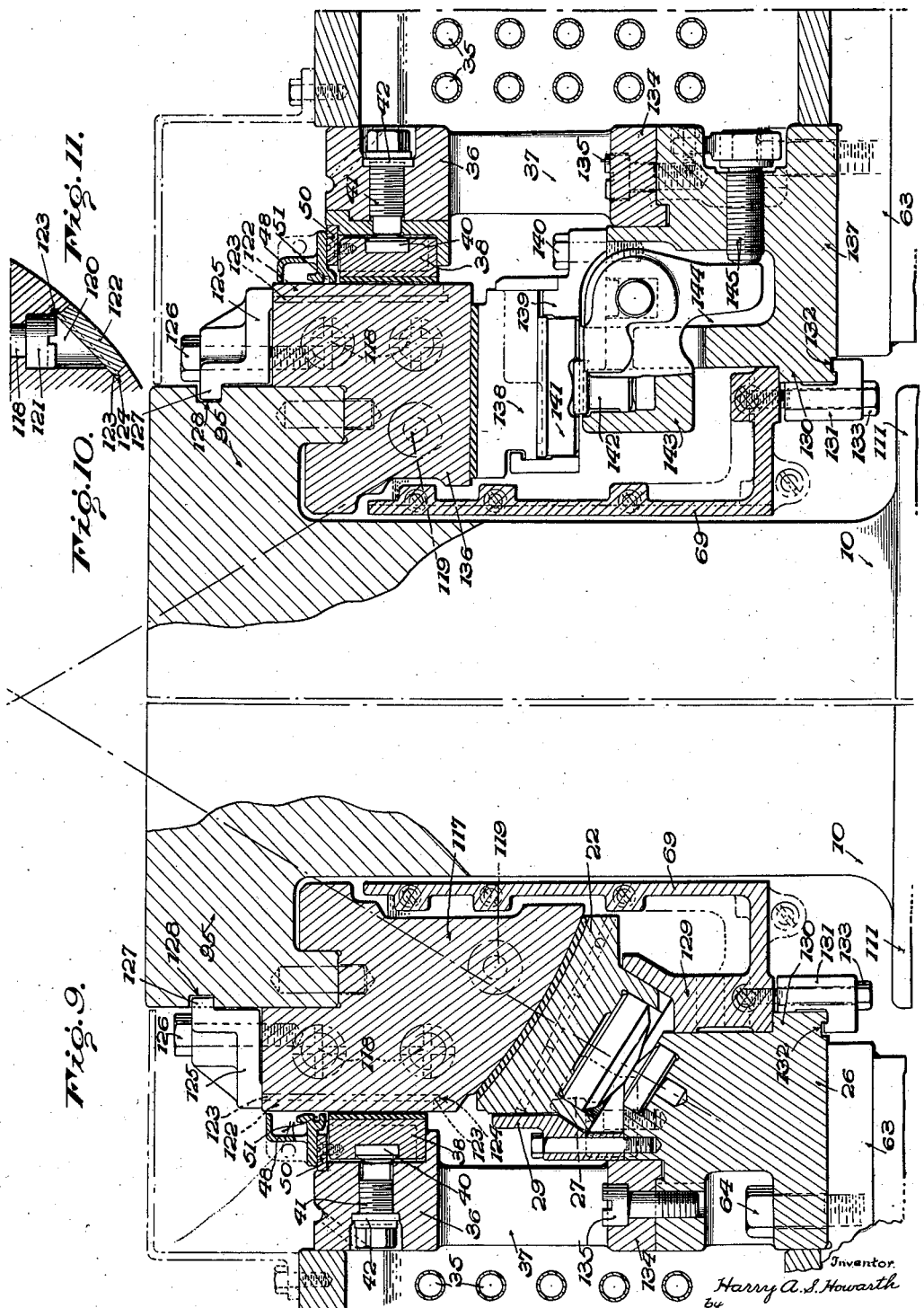

Patented Nov. 24, 1936

2,061,966

UNITED STATES PATENT OFFICE 2,061,966

BEARING

Harry A. S. Howarth, Philadelphia, Pa., assignor to Kingsbury Machine Works, Inc., Philadelphia, Pa., a corporation of Delaware Application July 30, 1932, Serial No. 626,606

71 Claims. (Cl. 308—160)

This invention relates to thrust bearings, and more particularly to thrust bearings of the type employing spherical or conical surfaces of bearing engagement, generally known and hereinafter referred to as spherical bearings.

Although spherical thrust bearings possess many advantages especially fitting them for installation in hydroelectric units, motor driven pumps and analogous machines, and are generally highly satisfactory for such use, they are sometimes utilized in connection with shafts which are subject to unusual operating conditions causing a lift of the shaft or some other abnormal stress tending to render ineffective the normal centralizing action of the spherical bearing. In such exceptional emergency situations, it is desirable that auxiliary bearings be available for preventing lateral or radial displacement of the shaft whenever the spherical bearing runner is lifted off the cooperating stationary spherical bearing member or shoes.

It is therefore one of the objects of the present invention to provide a spherical thrust bearing with novel auxiliary bearing means for maintaining the shaft centralized and preventing lateral or radial displacement thereof under emergency operating conditions when the spherical bearing elements are moved out of their normal cooperative engagement.

Another object is to provide in a unitary, self-contained structure a combined spherical and radial bearing which will efficiently maintain the shaft accurately centralized under all conditions of operation, normal or emergency.

A further object is to provide both a spherical thrust bearing and an auxiliary radial bearing mounted on a common base and so arranged that alignment of the shaft may be accomplished by bodily movement of the combined bearing structure as a unit.

Another object is to provide a spherical thrust bearing with a novel auxiliary radial bearing, mounted on the spherical bearing base and adapted for independent adjustment relative thereto into bearing engagement with the periphery of the shaft or of one of the rotatable thrust bearing elements.

Another object is to provide a combined spherical thrust and auxiliary radial bearing of standardized construction in which the spherical thrust bearing elements may be replaced by elements of a different size, or by flat thrust bearing elements, at the option of the user, and without requiring any change in the auxiliary radial bearing structure.

Another object is to provide a combined thrust and auxiliary radial bearing having a split runner forming a member common to both the thrust and radial bearings with novel means for preserving the continuity of the cylindrical periphery of the runner in spite of the use of counterbores for the heads of the joint bolts securing together the separable portions of the runner.

A still further object is to provide a combined spherical and radial bearing of novel construction including means for enabling the shaft to be lifted or lowered through the base ring of the bearing with a minimum of dismantling of the bearing elements.

Still another object is to provide a combined spherical and radial bearing embodying a novel lubrication system whereby the lubricant is efficiently and automatically circulated and supplied to both the spherical and radial bearing elements during rotation of the shaft.

These and other objects, including the provision of novel means for circulating oil about the radial bearing elements and for preventing aeration of the oil, will appear more fully upon a consideration of the detailed description of the invention which follows. Although several embodiments of the present invention are described and illustrated in the accompanying drawings, it is to be expressly understood that these drawings are for the purpose of illustration only and are not to be construed as a limitation of the scope of the invention, reference being had for this purpose to the appended claims.

In the drawings, wherein like reference characters indicate like parts throughout the several views:

Fig. 1 is an axial sectional view, with certain parts shown in full and others illustrated diagrammatically, of a combined spherical and radial bearing constituting one embodiment of the present invention;

Fig. 2 is a fragmentary plan view, with certain parts broken away, of the bearing shown in Fig. 1;

Fig. 3 is a fragmentary developed elevation of a portion of the inner surface of the radial bearing supporting ring of Figs. 1 and 2 showing a radial bearing shoe and means for supplying oil thereto and to the air-seal ring;

Fig. 4 is an enlarged plan view of one of the oil scoops or funnels shown in Figs. 1, 2, and 3 for supplying oil to the air-seal ring;

Fig. 5 is a half axial sectional view, similar to Fig. 1, of another bearing constituting another embodiment of the present invention;

Fig. 6 is another half axial sectional view of still another form of bearing constituting another embodiment of the present invention and including a novel oil circulating system;

Fig. 7 is a half axial sectional view of a bearing somewhat similar to that shown in Fig. 6 but having an enlarged opening in the base ring to permit vertical movement of the shaft without complete dismantling of the bearing elements;

Fig. 8 is a half axial sectional view of another bearing embodying features disclosed in both Figs. 5 and 7;

Fig. 9 is a half axial sectional view of another bearing somewhat similar to that shown in Fig. 1 but embodying a split runner and various other novel constructional features;

Fig. 10 is a half axial sectional view of the bearing of Fig. 9 provided with flat instead of spherical thrust bearing members, illustrating the interchangeability feature of this embodiment of the present invention; and Fig. 11 is a fragmentary sectional view taken through the runner of Fig. 9 substantially in the plane of one of the joint bolts showing a novel construction for preserving the continuity of the cylindrical periphery of a split runner.

Referring now to the embodiment disclosed in Figs. 1-4, there is shown more or less diagrammatically therein a known form of spherical thrust bearing into the construction of which there has been embodied a novel auxiliary radial bearing which is adapted to preserve centralization of the shaft during operation under exceptional emergency conditions when the spherical bearing elements are moved out of their normal cooperating engagement. In the form illustrated, shaft 10 carries in any suitable way a rotary thrust element, here shown as composed of a thrust block and a runner separate therefrom but attached thereto. The thrust block 11 may be made in one piece with the shaft or, as indicated at 12, may be keyed thereto. The lower or inner face of thrust block 11 is made conical as shown at 13, and at its outer periphery said conical surface terminates in a turned cylindrical surface 14, axially above or outside of said cylindrical surface there being a radial flange 15.

Mounted on thrust block 11 and drivingly connected therewith in any suitable manner is a runner 16 provided with an upper or outer conical surface 17 which mates with the conical surface 13 of thrust block 11, and with a turned cylindrical surface 18 which constitutes a close fit with the turned cylindrical surface 14 of the thrust block. The close fit between the surfaces 14 and 18 provides for exact preliminary alignment of the parts when the runner is assembled with the thrust block, but during the normal operation of the bearing, owing to the conical surfaces of engagement between the thrust block and the runner, said runner can expand relatively to the thrust block under the increase in temperature arising from the heat of the friction generated during the normal operation of the bearing without losing its concentricity with respect to the thrust block, even though the surface 18 expands somewhat away from the surface 14. In the form shown runner 16 is drivingly attached to the thrust block 11 by bolts or screws 19 which pass through flange 15 into the axial flange 20 formed on the runner around turned surface 18.

The lower or inner surface of runner 16 is provided with a convex spherical bearing surface 21, the radius and center of curvature of said bearing surface being suitably selected and located in accordance with the principles more fully explained in U. S. Patent No. 1,739,362 to Albert Kingsbury, dated December 10, 1929, and, as explained in said patent, the conical surfaces 13 and 17 are preferably made parallel to the tangent to said spherical surface 21 at the mean radius, or the mean normals of the conical fit should pass through the center of the spherical curvature of the bearing surfaces.

Cooperating with the spherical bearing surface 21 of the runner is a stationary bearing member of any suitable construction, which may be composed of structurally independent shoes, or interconnected shoes, or the stationary bearing member may take the form of a flexible or semi-flexible unitary or sectional element. As shown, the stationary bearing member is in the form of a plurality of shoes 22 having concave spherical bearing surfaces 23 which mate with the convex spherical surface 21 of the runner. Shoes 22 may be mounted in any suitable way, with or without provision for suitable interequalization of the pressure between adjacent shoes, being shown, however, as provided in their rear faces with spherically surfaced blocks 24 which engage with suitable surfaces on blocks 25 carried by a thrust base ring 26 of any suitable type and construction, whereby said shoes are mounted to tilt both radially and circumferentially with respect to the axis of the bearing.

In the form shown, the shoes 22 are retained against displacement by a lug ring 27 having a keyed engagement with base ring 26 as indicated at 28, and by a retaining ring or band 29 having keyed engagement with the upper surface of lug ring 27 as indicated at 30. Both retaining ring 29 and lug ring 27 may be made in sections adapted to be bolted together, if desired, but are preferably made in one piece so as to have equal stiffness in all directions, and are secured to a radial flange 31 on base ring 26 by suitable bolts 32.

Base ring 26 is also shown as provided with suitable passages 33 for oil circulation, the oil well of the bearing being provided by an inner oil retaining sleeve or wall 34, which may be suitably secured to either base ring 26 or the thrust deck to which said ring is secured, and an outer oil retaining wall or housing (not shown), to which well or reservoir oil may be supplied from any suitable source and in which it may be cooled by the provision of a suitable cooling coil 35.

The structure thus far described, and illustrated more or less diagrammatically in the drawings, comprises a known form of spherical bearing which under all normal operating conditions accurately maintains shaft 10 centralized and effectively opposes any tendency toward lateral or radial movement thereof, due to the cooperation of the spherical bearing surfaces of runner 16 and shoes 22.

In installations, however, where the shaft is subject to unusual stresses which tend to lift or otherwise move the spherical bearing surfaces out of engagement with one another, it is preferable that the bearing structure also include auxiliary radial bearing means for steadying and maintaining the shaft centralized during the time that the runner is out of engagement with the shoes. It is also desirable that such radial bearing means be incorporated in the same unitary structure with the spherical bearing elements so that the entire bearing assembly may be shifted as a unit when necessary to align the shaft.

In the embodiment shown in Figs. 1-4, retaining ring 29 is provided with and preferably made integral with an upper portion or bearing supporting ring 36 surrounding the outer periphery of runner 16 or thrust block 11 and supported on retaining ring 29 by a plurality of circumferentially spaced webs 37 of any suitable character. The inner surface of supporting ring 36 is provided with a plurality of circumferentially spaced recesses 37 (shown best in Fig. 2) in each of which is mounted a tiltable bearing shoe 38 having a cylindrical bearing surface 39 conforming to the peripheral surface of runner 16. Each shoe 38 is provided in its rear face with a block 40 having a spherical surface of contact with the inner end of a jackscrew 41 which is threaded into supporting ring 36 and by means of which the clearance between the bearing surface 39 of shoe 38 and the runner periphery may be adjusted to any desired emergency value, so that if the shaft should lift, the runner cannot move laterally or radially more than this predetermined amount. In making this adjustment, jackscrews 41 are first set up until the desired clearance is obtained between the shoes and the runner periphery, the space between the heads of the jackscrews and the outer face of supporting ring 36 is then measured, jackscrews 41 are removed, washers 42 of the necessary thickness are placed upon said screws and the screws are then returned and tightened up to the extent permitted by said washers.

By this means the clearance between the radial shoes and the runner periphery may be set to any desired value, so that if the shaft should lift, or if other forces should tend to move the shaft radially, the runner will be prevented from moving sidewise more than this predetermined amount, as for example 1/64 of an inch. With such clearances, the relatively thick film of oil maintained between the radial shoes and the runner, or other rotatable element of the shaft assembly, will not waste an undue amount of power under normal operation of the unit, and will yet subserve the important function of maintaining the shaft centralized under emergency operating conditions.

Although the radial bearing elements are preferably adjusted as previously described so as to become effective only during unusual operating conditions, it will be understood, that, if desired, they may be set to the usual radial bearing clearances so as to also continuously supplement the normal centralizing action of the spherical thrust bearing.

In the embodiment shown in Figs. 1-4, radial bearing shoes 38 are disposed above the spherical bearing elements and above the normal level of the oil within the well. Accordingly, novel means have been provided for automatically supplying oil to the radial bearing shoes when the runner 16 is rotating. As shown best in Fig. 3, an oil deflector member indicated generally at 43 is secured to the inner surface of supporting ring 36 in any suitable manner between each pair of radial bearing shoes 38, each of said deflectors being so shaped and so positioned as to divert some of the oil set in motion by the rotation of runner 16 up into the spaces between and over shoes 38.

Each deflector member 43 comprises a deflecting surface 44 in the form of an inverted V, the plane of said surface being perpendicular to the inner face of supporting ring 36. The lower extremities of said inverted V lie below the bottom surface of radial bearing shoes 38 and are curved outwardly into a substantially horizontal plane so as to present the edges to the flow of oil created by rotation of runner 16, while the vertex of said surface lies substantially on a level with or just below the upper surface of shoes 38. Deflecting surface 44 is preferably made integral with and perpendicular to a mounting frame 45 having bottom projections 46 adjacent the lower extremities of deflecting surface 44 and cooperating therewith to initially direct the intercepted oil upward along said surface, and upper bracket-shaped arms 47 the horizontal portions of which are adapted to fit in suitable recesses formed in the upper surface of supporting ring 36 and to be secured thereto in any suitable manner as by dowels.

When so mounted, the inner edges of deflector members 43 lie closely adjacent the periphery of runner 16, as shown best in Figs. 1 and 2, and the lower extremities thereof, which are curved into the direction of flow of the oil created by rotation of runner 16, deflect or divert a portion of said oil upwardly along surfaces 44 to the tops thereof whence the oil passes between and over said shoes so as to insure thorough lubrication thereof. As shown in the drawings, each deflector member 43 is made symmetrical so as to be operative for either direction of shaft rotation.

In order to prevent aeration, it is preferable that air sealing means be provided above the level of the oil within the well. Accordingly, an air-seal ring 48, which may, if desired, be made in two halves and bolted together as indicated at 49, is mounted in any suitable manner above the radial bearing shoes 38 and closely surrounds the periphery of runner 16 and thrust block 11. In the form shown, air-seal ring 48 is supported on an upper shoe retaining ring 50 which is in turn secured to the portions of supporting ring 36 intermediate radial bearing shoes 38. Air-seal ring 48 is provided with an oil groove 51 which is kept full of oil during rotation of the shaft in any desired manner. In the embodiment disclosed in Figs. 1-4, the oil pressure necessary to fill oil seal groove 51 is provided by one or more oil scoops or funnels 52 which are mounted on the under side of supporting ring 36 with the open ends thereof closely adjacent to the periphery of runner 16 and directed into the path of the oil set in motion by rotation of said runner, said funnels being connected by suitable conduits or passages in supporting ring 36, retaining ring 50 and the base of air-seal ring 48 and leading to oil seal groove 51. As shown best in Figs. 3 and 4, oil scoops or funnels 52 are mounted under the same portions of supporting ring 36 to which deflector members 43 are secured, and the open ends of said funnels are therefore preferably located below the level of the lower extremities of said deflector members so as to be in position to receive a suitable portion of the oil flow created by rotation of the shaft.

Fig. 5 discloses another embodiment of the invention, the bearing shown therein being generally similar in structure to that disclosed in Figs. 1-4, but differing therefrom in that the runner 53 is made integral with the thrust block 54, so as to form a flanged or shouldered rotatable element, and that the radial bearing shoes 38 surround the periphery of thrust block 54 just above the upper surface 55 of the runner flange. With this construction, supporting ring 36 is somewhat thicker than in the preceding embodiment and overhangs the flange of runner 53.

This form of bearing also embodies a novel multiple-path oil circulating system, the flow of the oil being indicated in the drawings by arrows.

As shown, the cooling coil 35 is supported on a rack 56 suitably secured to base ring 26, said rack being provided at its top with a horizontal annular baffle plate 57 surrounding supporting ring 36 from the outer edge of which is suspended a vertical cylindrical baffle plate 58 extending downwardly in the oil well approximately the depth of cooling coil 35. In addition to the usual oil passages 33 formed in base ring 26 and the passages between spherical bearing shoes 22 forming the normal oil circuit of a spherical bearing of this character, supporting ring 36 is provided with suitable radial passageways 59 leading to the inner surface of said ring adjacent the periphery of thrust block 54 with which radial shoes 38 engage and above the flanged runner 53, while the structure connecting supporting ring 36 with retaining ring 29 is provided with a plurality of openings or passageways 60 lying in substantially the same plane with flanged runner 53 and acting as common return passageways to the oil reservoir for the oil supplied to both the thrust and radial bearing elements.

With this construction, oil is delivered through passageways 59 to the spaces between radial shoes 38, whereby said shoes are adequately lubricated. From the shoes 38 the oil flows down on top of the upper surface 55 of runner 53, is thrown outwardly by centrifugal force due to the rotation of said runner through openings or passageways 60 between webs 37 on which supporting ring 36 is mounted, passes around the cooling coil, under the bottom of vertical baffle plate 58, upwardly and over horizontal baffle plate 57 into passageways 59 again. At the same time the oil for the thrust bearing elements passes through passages 33, between spherical shoes 22, and, joining with the oil from the radial bearing elements, is forced outwardly through passageways 60 back into the reservoir. In order to avoid undue aeration, an annular angle plate 61, which may be made in halves and bolted together as indicated at 62, is secured in any suitable manner to supporting ring 36 with the lower edge of its vertical portion supported by any suitable means slightly above horizontal baffle plate 57 in such a manner as to leave only a restricted passageway close to said plate for the flow of the oil into radial passages 59, and into which the oil is drawn by the pumping action of surface 55 on the oil.

The embodiment of Fig. 5 may also be provided with oil deflector members between the radial bearing shoes of the type disclosed in Figs. 1-4, and suitable scoop or funnel means may likewise be provided for supplying oil to the oil seal groove 51 of air-seal ring 48, if desired.

In still another form of the present invention illustrated in Fig. 6, the auxiliary radial bearing members are mounted within the bore of the base ring itself, thereby utilizing space otherwise wasted, and novel means are provided for lubricating these elements and for circulating the oil throughout the combined bearing. In the embodiment shown, the thrust base ring 26 is supported by and secured to a thrust deck or girder 63 as by bolts 64, suitable wedge blocks 65 being provided for adjusting the position of said base ring with respect to the shaft 10. The inner surface of base ring 26 surrounding the shaft is provided with a plurality of circumferentially spaced recesses in each of which is housed a radial bearing shoe 38, similar to those previously described. A suitable shoe supporting ring 66 may be secured to the bottom portion of base ring 26 as by screws or bolts 67 so as to hold shoes 38 within their respective recesses, and may also be adapted to support a sealing ring 68 which closely surrounds shaft 10 for preventing leakage of oil therealong.

With the radial bearing elements thus incorporated in the thrust base ring itself, it is clear that adjustment of both the spherical and radial bearing elements may be effected simultaneously and the entire bearing structure moved as a unit, as by the use of wedge blocks 65, in aligning shaft 10 with the elements of the generator, turbine or other mechanism with which it is associated. The jackscrews 41, and associated thrust pins if such are used, for adjusting radial bearing shoes 38 are housed in and extend outwardly of the thrust block 26, thus making it possible for the positions of said shoes to be adjusted relatively to the spherical bearing elements.

The novel lubricating system disclosed in Fig. 6 comprises a main and an auxiliary oil reservoir, means for supplying oil from these reservoirs to the various bearing elements and means for circulating oil from the auxiliary reservoir to the main reservoir, and return, for cooling. As shown, the main oil reservoir or well comprises the space surrounding the spherical bearing elements above thrust base ring 26 and thrust deck 63 bounded by a cylindrical inner oil retaining sleeve or wall 69 surrounding shaft 10 and secured to the upper surface of base ring 26 as by screws 70, and an outer wall or housing 71 which may be of any desired construction but is usually made rectangular and welded or otherwise suitably secured to thrust deck 63. The main reservoir or well thus formed is normally maintained full of oil to the level of the top of retaining wall 69, and contains a suitable cooling coil indicated at 35. The oil contained in this main reservoir circulates about the spherical bearing elements in the usual manner, and a suitable air sealing oil ring is indicated at 48′ to prevent aeration of the oil.

In addition to this main reservoir or well, an auxiliary reservoir is provided by means of an annular pan 72, substantially U-shaped in cross section, which is adapted to be suitably secured to the under surface of base ring 26 as by bolts or screws 73 in a position surrounding shaft 10 and so located as to receive the oil utilized for lubricating the radial bearing elements. If desired, pan 72 may be made in sections and bolted together as indicated at 74.

Novel means have also been provided for pumping the oil from the auxiliary reservoir formed by pan 72 to the elements of the radial bearing, and for circulating it through the main reservoir for cooling purposes. In the embodiment disclosed, the pumping means comprises a viscosity pump of known construction, such as is disclosed in my copending application Serial No. 556,440, filed August 11, 1931, the rotary pumping element being provided by an annular impeller member 75 supported in a suitable groove 76 in shaft 10 and rotatable therewith, the horizontal pumping surface of said impeller being disposed well below the surface of the oil in pan 72 and supporting thereon a viscosity pumping ring 77. The vertical outlet tubes 78 cooperating with pumping ring 77 and through which the oil is pumped in the known manner, deliver the oil to the bores 79 of suitable pipes 80 with which tubes 78 are in telescopic engagement. Pipes 80 may be suitably secured to the under surface of base ring 26 as by flanges 81 and screws 82, and are so positioned as by dowels 83 that bores 79 are in registration with passageways 84 provided in base ring 26. Passageways 84 extend upwardly through the base ring and terminate in a groove 85 in the upper surface of said ring on which oil retaining wall 69 is supported, which groove communicates with the space between the inner surface of base ring 26 and the periphery of shaft 10, just above radial bearing shoes 38, by a plurality of restricted passageways 86.

Oil is thus pumped from pan 72 upwardly through tubes 78, the bores 79 of pipes 80, passageways 84, groove 85 and restricted passageways 86 to the space surrounding shaft 10 just above shoes 38, whence it flows downwardly between and around said shoes, the lower limit of its flow being defined by shoe supporting ring 66 and seal ring 68. The oil thus supplied to the radial bearing elements is returned to pan 72 through horizontal and vertical passages 87 formed in the lugs 88 of base ring 26 lying between shoes 38, bushings 89 connecting vertical passages 87 with recesses 90 formed in base ring 26, and thence downwardly through suitable tubes 91 which are threaded at their lower ends into shoe retaining ring 66 and extend upwardly through passages 87 and bushings 89 into recesses 90. The lower ends of tubes 91 discharge the oil downwardly onto rotatable pumping impeller 75 whence it flows back into pan 72. In order that the return flow of the oil may not be impeded at high speeds when the entire space between shoes 38 and around shaft 10 is filled, additional radial passageways 92 may be provided, just below restricted passageways 86, communicating with the upper ends of recesses 90. The upper ends of tubes 91 are so arranged as to ensure that the shoes 38 are immersed in a body of oil retained in the inter-shoe spaces by the oil seal ring 68.

In addition to the novel means just described for supplying oil from the auxiliary reservoir formed by pan 72 to the elements of the radial bearing, means are also provided for circulating the oil from pan 72 through the main reservoir and return, in order that it may be cooled by cooling coil 35. As shown, each vertical passageway 84 through base ring 26 connects with a horizontal passage 93 leading to the outer surface of the base ring where it in turn connects with a suitable pipe 94, the delivery end of which is positioned above the level of the oil in the main reservoir. With this construction, when the space between and around radial shoes 38 and shaft 10 has been filled with oil through the passages previously described, which filling takes place very quickly upon initial rotation of the shaft, the excess of the oil pumped from pan 72 over that required to maintain said space full passes through passages 93 and pipes 94 into the main reservoir. However, since the normal level of the oil within said reservoir is equal with the top edge of inner retaining wall 69, any addition of oil to the main reservoir through pipes 94 causes an overflow into the space between retaining wall 69 and the periphery of shaft 10, the overflowing oil running down along the shaft into the space around radial shoes 38 and being returned to pan 72 through the passages previously described. Thus, all of the oil raised by the viscosity pump from the auxiliary reservoir eventually flows back into it, with the advantage that in flowing through the main reservoir it becomes cooled through the action of cooling coil 35, and the relative flow of the oil through the two paths thus provided is determined by suitably proportioning the passageways 84 and 93.

Still another bearing is disclosed in Fig. 7, this bearing being similar to that of Fig. 6 in so far as the general constructional features of the bearing elements and the type of lubrication system are concerned, but differing therefrom in certain details of the mounting of said elements, particularly in the enlargement of the bore of the thrust base ring so as to permit the shaft, which may have an integrally formed flange at its lower end as well as a thrust block at its upper end, to be raised or lowered through the base ring. This bearing is also provided with a novel form of cooling coil which permits removal of the spherical bearing shoes without disturbance of the coil and novel means for supplying oil to the sealing groove of the air-seal ring.

In the form shown, the thrust base ring 26 of Fig. 6 is subdivided into two concentrically arranged detachable portions, of which the outer portion or base ring proper designated 26, which may be supported on and secured to thrust deck 63 as by bolts 64 in the usual manner, is provided with an enlarged bore of sufficient diameter to permit the passage therethrough of a lower flange (not shown) with which shaft 10 may be provided or of thrust block 95 here shown made integral with shaft 10. With this construction, the thrust runner 96 is preferably made in halves and bolted together as indicated at 97 so that, if desired, the runner may be put in place or removed after the shaft has been installed. Likewise, shoe retaining ring or band 29 may be made in sections.

With a base ring of this character, novel means must be provided for supporting the radial bearing shoes within the enlarged bore of said ring, and also for cooperating with the base ring in the support of the spherical bearing elements. As shown, an annular radial shoe housing or supporting ring 98 having an external diameter substantially equal to the internal diameter or bore of base ring 26, so as to have a sliding fit therewith, is located within the bore of said ring and may be secured thereto by means of a tie ring 99 which is adapted to rest upon suitable shoulders formed on both supporting ring 98 and base ring 26 and to be secured to both of said rings by a double set of bolts or screws, one set indicated at 100 passing through supporting ring 98 and the other set indicated at 101 passing through base ring 26. The upper surface of supporting ring 98 is preferably so shaped as to engage the inner lower surfaces of spherical shoes 22 and thus assist base ring 26 in supporting said shoes in their operative positions. Both supporting ring 98 and tie ring 99 are preferably made in halves and bolted together as indicated at 102 and 103, respectively. It will also be understood that tie ring 99 may be made integrally with either supporting ring 98 or base ring 26.

Radial bearing shoes 38 are housed within suitable recesses formed in supporting ring 98 in the same manner as indicated and described in connection with the embodiment of Fig. 6 i. e. being retained in said recesses by a suitable ring 66 secured to ring 98 by screws or bolts 67 (see Fig. 6). In this connection, it will be understood that the thrust pins 104 which cooperate with jackscrews 41 in the adjustment of radial shoes 38 are made in sections, one section of each of said pins being housed in supporting ring 98 and the other section in thrust base ring 26, the two sections abutting one another at the surface of engagement between said rings when the bearing elements are assembled.

In the construction illustrated, inner retaining wall 69 of the main oil reservoir, pan 72 of the auxiliary oil reservoir and the associated oil pumping elements are also made in halves, which are adapted to be bolted together when assembled, in order that these parts may be assembled about the shaft when the lower flange and the thrust block 95 are made integral with the shaft.

With this construction, it will be seen that if the outer set of bolts 101 is removed, leaving tie ring 99 secured to supporting ring 98, and after spherical bearing shoes 22 have been removed along the path indicated by the broken line arrows in Fig. 7, shaft 10 may be lifted through the enlarged bore of base ring 26 with the majority of the bearing elements supported upon the hub of the viscosity pump impeller 75. If, as indicated in Fig. 7, the auxiliary oil reservoir formed by pan 72 is connected by a suitable pipe 105 to a supplementary oil supply, the connection between pipe 105 and the pan 72 must be broken before shaft 10 can be lifted as described. It is also apparent that with this construction of the various elements, by removing the inner set of bolts 100, the radial bearing elements, the inner oil retaining wall 69 and the auxiliary oil reservoir and viscosity pump parts can all be removed from below the spherical bearing without disturbing the elements of the latter. These same elements may also be removed from above thrust deck 63 after runner 96 and spherical bearing shoes 22 have been removed.

In connection with the removal of spherical bearing shoes 22, it is to be noted that cooling coil 35 is so constructed and arranged that none of its coils lie in the arcuate path, indicated by the broken arrows in Fig. 7, along which the spherical shoes are moved during withdrawal from the bearing assembly. With this construction, it is not necessary to remove the cooling coil when it is desired to withdraw the spherical bearing shoes.

Although the means for supplying oil to the spherical and radial bearing elements are substantially the same in this embodiment as in that shown in Fig. 6, novel means have been added in the embodiment of Fig. 7 for promoting circulation of the oil in the main reservoir around cooling coil 35, which means also serve to supply oil to the oil sealing groove 106 of air-seal ring 107. As shown, spherical bearing runner 96 is provided with a plurality of radial passageways 108 therethrough leading from its inner periphery outwardly and upwardly to its outer periphery, thus providing in effect a centrifugal oil pump for taking oil from the space between the inner surface of runner 96 and inner retaining wall 69 and pumping it through passageways 108 to the main reservoir or well where it is circulated about cooling coil 35. The outer ends of passageways 108 are located below air-seal ring 107 but branch passageways 109 may be provided leading upwardly from passageways 108 to the outer periphery of runner 96 at a level within oil seal groove 106 for maintaining an adequate supply of oil to said groove. With this construction, it is preferable that a seal ring 110 be provided surrounding the inner periphery of runner 96 just below the oil level so as to prevent the aerated oil surrounding the runner from mixing with the oil that is pumped outwardly through passageways 108. It will be noted that the oil pumping means thus provided by passageways 108 and 109 is operative for either direction of rotation of the shaft.

Referring now to Fig. 8, the bearing disclosed therein represents a modification of the bearing disclosed in Fig. 5 embodying two additional features also found in the disclosure of Fig. 7, namely the provision of a base ring having a bore sufficiently enlarged to permit the lifting therethrough of a shaft provided with an integral lower flange, and the provision of diagonal radial passageways in the spherical bearing runner for the purpose of supplying oil to the oil groove of the air-seal ring.

As shown, base ring 26 is made with its internal diameter or bore slightly larger than the lower flange 111 of shaft 10, so as to permit upward movement of said flange without removing the base ring. This enlargement of the bore of the base ring, however, necessitates the provision of an auxiliary spherical shoe supporting ring 112 which is adapted to be supported on a suitable shoulder formed in the inner surface of base ring 26 and to be secured thereto as by bolts 113, said auxiliary ring being so shaped as to support the inner lower surfaces of spherical bearing shoes 22. Auxiliary supporting ring 112 also provides a support for the inner oil retaining wall 69 which is preferably made in halves adapted to be bolted together and secured to said ring as indicated at 114. Auxiliary supporting ring 112 is also preferably made in halves and bolted together as indicated at 115.

The remaining structure of the bearing shown in Fig. 8, including the oil circulating means, is substantially the same as that previously described in connection with Fig. 5, with the exception that instead of supplying oil to oil sealing groove 51 of air-seal ring 48 by the scoop or funnel means disclosed in detail in Figs. 1–4, the cylindrical portion of thrust block 54 just above runner 53 is provided with a plurality of diagonal radial passageways 116 leading from the inner periphery of said rotatable block, at points below the level of the oil in the space between said block and inner oil retaining wall 69, upwardly and radially outwardly to the outer periphery of said block at points on a level with oil groove 51. As explained in connection with Fig. 7, passageways so constructed act as a centrifugal pump and maintain said oil groove full of oil during rotation of the shaft regardless of the direction of rotation.

With this construction, shaft 10 and its integral flange 111 may be lifted upwardly through base ring 26 by removing spherical shoes 22, auxiliary supporting ring 112 and inner retaining wall 69. Although the latter two elements may be readily withdrawn by removing bolts 113 and separating said elements into their halves, some difficulty might be experienced in removing spherical shoes 22. However, this difficulty can be avoided either by first raising spherical shoe retaining ring or band 29 and its associated radial shoe supporting ring 36 out of the path of said spherical shoes, or by so designing retaining ring 29 and supporting ring 36 that vertical webs 37 lie between spherical shoes 22 and are sufficiently spaced to permit said shoes to be removed through the spaces between them.

Fig. 9 discloses still another embodiment of the invention, the bearing shown therein being somewhat similar in structure to that disclosed in Figs. 1–4, but differing therefrom in that the runner is split into a plurality of separable portions which are joined together by suitable bolts, which construction also includes the provision of novel means for covering the counterbores in which the heads of said bolts are housed so as to preserve the continuity of the cylindrical peripheral bearing surface of said runner. This form of bearing also embodies a novel form of oil retaining sleeve which not only forms the inner wall of the oil reservoir but also assists in the support of the spherical bearing shoes, and an improved arrangement of the means for supporting the auxiliary radial bearing elements in position to engage the cylindrical periphery of the runner.

In the form shown, the shaft 10 is provided with both an upper enlarged flange or thrust block 95 and a lower flange 111 which construction requires, when it is desired that the shaft be capable of vertical movement through the thrust base ring without disassembly of the latter, that base ring 26 be provided with an interior diameter greater than that of said flanges. The thrust runner 117 is split into a plurality of separable portions, preferably into halves, which portions are secured together by a plurality of suitable joint bolts 118 each of which may be provided with a sleeve-type dowel where the surfaces of the separable runner sections come together. A blind dowel 119 may also be provided nearer the center portion of the runner than bolts 118.

As diagrammatically indicated in Fig. 9 and shown best in Fig. 11, the cylindrical peripheral surface of runner 117 is provided with counterbores 120 to receive the heads 121 of bolts 118, and in order to preserve the continuity of said cylindrical surface against which the radial bearing elements engage, suitable cover plates 122 may be provided to cover said counterbores. Each of cover plates 122 has an outer cylindrical surface of the same curvature as the peripheral surface of runner 117, and said plates are secured in place over their respective counterbores by the engagement of side and bottom flanges 123 projecting from each plate 122 with vertical and horizontal grooves 124 formed in runner 117.

The assembled runner may be secured to upper flange or thrust block 95 in the manner indicated in Fig. 1, but is preferably provided with a plurality of clamp blocks 125 each of which is secured to the upper surface of runner 117 as by a bolt or screw 126 and is also provided with inwardly extending lugs or a flange 127 which engages a circumferential groove 128 formed in the outer periphery of flange or block 95. Whenever a split runner and cover plates 122 are used, clamp blocks 125 are preferably of such width as to extend outwardly over the tops of cover plates 122 so as to hold them down in position, as indicated in Fig. 9.

The spherical bearing surface of runner 117 is supported upon the usual thrust receiving bearing shoes 22 which transmit the thrust to and are supported on as well as guided by the thrust base ring 26 secured to thrust deck 63, as by bolts 64 in the usual manner. Since base ring 26 is provided with an enlarged bore of sufficient diameter to permit the passage therethrough of either upper flange 95 or lower flange 111 of shaft 10, additional means must be provided for cooperating with the base ring in the support of the spherical bearing shoes. In the embodiment illustrated, inner oil retaining sleeve 69, which is preferably made in sections adapted to be bolted together, is preferably made integral with an annular auxiliary shoe supporting ring 129 which is so shaped as to engage the inner lower surfaces of shoes 22 and thus assist base ring 26 in supporting said shoes in their operative positions. Auxiliary supporting ring 129 is adapted to have a sliding fit with the inner bore of base ring 26 and to be supported upon a relatively narrow shoulder 130 formed integrally with said base ring, said elements being securely fastened together to provide an oil-tight joint therebetween by means of suitable L-shaped clamps 131 each of which engages by its bottom leg a groove 132 formed in the bottom of base ring 26 and is secured to supporting ring 129 by suitable bolts or screws 133.

The embodiment of Fig. 9 also differs from the bearings previously discussed in that lug ring 27, shoe retaining ring 29 and radial bearing supporting ring 36 are all individually secured by suitable bolts or screws to base ring 26 so that each may be removed independently of the others. Also, lug ring 27 and shoe retaining ring 29 may be divided into a plurality of individual, circumferentially spaced segments so that those associated with any one shoe may be removed independently of the others. The construction of supporting ring 36 and its associated radial bearing elements and lubricating devices is generally similar to that previously described in connection with the embodiments of Figs. 1, 7 or 8 (the provision for oil circulation being omitted from the illustration to avoid complications), with the exception that the supporting ring 36 of Fig. 9 is provided with a lower flange 134 which is supported directly upon base ring 26 and secured thereto as by bolts or screws 135.

As previously described, webs or struts 37 are preferably spaced apart a sufficient distance to permit bearing shoes 22 to be removed through the spaces between them. With this construction, it is possible to remove any particular shoe from the bearing for examination independently of the others by first removing its associated shoe retainer segment and then, after removing the thrust load, withdrawing the shoe radially through the space between two of webs 37. In order to remove the load from the thrust bearing, thrust bearings are now generally provided with brake shoes which press against the rim of the generator rotor, which shoes not only may be operated by air pressure when used as brakes, but also may be actuated by oil and used as lifting jacks. The utilization of such means avoids the necessity for unscrewing the jackscrew of a bearing shoe every time that it is desired to remove it for examination.

One of the additional advantages of a bearing of the type disclosed in Fig. 9 is that its novel structure lends itself readily to commercial standardization. For example, it is desirable that the construction of thrust bearings be so far standardized that the user may, at his option, install either spherical or flat thrust bearing elements without entirely rebuilding the bearing structure. The bearing shown in Fig. 10 illustrates how flat thrust bearing elements may be interchanged with the spherical bearing elements of Fig. 9 without requiring any change in the auxiliary radial bearing structure, or the lubricating system.

As shown, the spherical thrust runner 117 is replaced by a plane surface runner 136, formed in sections, which is or may be secured to the upper flange or thrust block 95 of shaft 10 in exactly the same manner as spherical runner 117. A thrust base ring 137 of the same external dimensions and general shape is bolted to thrust deck 63, supports inner oil retaining sleeve 69 and radial bearing supporting ring 36 in the same manner as spherical thrust base ring 26. Base ring 137 differs from base ring 26, however, in the structure utilized for supporting thrust receiving bearing shoes 138 which in turn differ from spherical bearing shoes 22 in that they are provided with plane bearing surfaces matching the thrust bearing surface of runner 136. As shown, each shoe 138 is held within shoe retaining cage 139 which is secured to the upper surface of base ring 137, as by bolts or screws 140, and said shoes rest upon blocks 141 which in turn transmit their thrust to pins 142 each of which is housed in one arm of a suitable bell crank lever 143 pivotally mounted within a recess 144 formed in base ring 137. The other arm of each of said bell crank levers 143 abuts the inner end of a jackscrew 145 the head of which extends outwardly beyond the outer surface of base ring 137 so as to be capable of ready adjustment.

While this particular plane thrust bearing structure forms no part of the present invention, the fact that it may be readily substituted for or interchanged with the spherical bearing structure disclosed in Fig. 9 indicates another of the advantages inherent in the present invention.

Another advantage of commercial importance possessed by the bearings of the present invention resides in the fact that the same thrust base ring and auxiliary radial bearing elements may be utilized with shafts and thrust bearing shoes of varying sizes. By maintaining the same mean shoe radius, i. e., the distance from the center of the shaft to the effective supporting point of the shoe, the same base ring and auxiliary radial bearing elements may be used for shoes of large area with a relatively small shaft, shoes of medium area with a medium shaft, and shoes of small area with a large shaft. In each case, the outer periphery of the runner will be maintained the same, although the interior diameter will vary in accordance with the diameter of the shaft. It will also be necessary to vary the diameter of the inner oil retaining sleeve in accordance with the diameter of the shaft. However, the fact that the same thrust base ring and radial bearing elements may be utilized with different sized shafts greatly simplifies manufacturing by reducing the number of standard sizes of base rings which must be provided.

It will be perceived from the preceding description that there is thus provided by the present invention a new and improved thrust bearing of the spherical type embodying auxiliary radial bearing means which are available at times of emergency for preventing lateral or radial displacement of the shaft when due to some abnormal operating condition the normal centralizing effect of the spherical bearing elements is reduced or destroyed. In providing such auxiliary radial bearing means, a novel supporting structure therefor has been incorporated in the spherical bearing structure such that the radial bearing elements may not only be moved bodily with the spherical bearing to effect centralization of the shaft by adjustment of the entire bearing structure as a unit, but also be adjusted independently of and relatively to the spherical bearing so as to permit a careful setting of said radial bearing elements after the shaft has been aligned with relation to the principal bearings of the machine as well as to govern the maximum radial displacement of the shaft which may take place should the spherical bearing elements be moved out of their normal cooperative engagement with each other. The combined unitary bearing structure thus provided is substantially as compact as the normal spherical thrust bearing, and yet provides the additional safety factor for unusual and emergency operating conditions contributed by the incorporation of the auxiliary radial bearing.

The invention also provides novel means for lubricating the radial bearing elements as well as the spherical bearing, and for circulating the oil in a novel manner so as to expedite the cooling thereof. Various forms of oil distributing devices have been provided for insuring adequate lubrication for the radial bearing shoes, said devices being automatic in operation as long as the shaft is rotating and operative regardless of the direction of rotation of said shaft. A novel arrangement of centrifugal oil pump is also disclosed for supplying oil to the groove of the air-seal ring of the bearing and for circulating oil through the main oil reservoir.

The invention also includes the provision of a combined spherical and radial bearing which is so constructed and arranged that the shaft with its integral flange and thrust block may be raised and lowered through the base ring with the latter in its normal position, the enlarged bore necessary to such a construction also including the provision of novel bearing supporting elements as disclosed. The novel construction of these elements, particularly those of the radial bearing, enables ready removal of these elements without disturbing the spherical bearing structure.

Although a number of embodiments of the invention have been shown and described in detail, it is to be expressly understood that the illustrated embodiments are not exclusive, as various other forms of bearing will now readily suggest themselves to those skilled in the art, while changes may be made in the details of construction, arrangement and proportion of parts, and certain features used without others, without departing from the spirit of the invention. Features which have been shown only in conjunction with certain embodiments may be combined with features shown in other embodiments, while various features may be used independently, all of which will be readily apparent to those skilled in the art. It will be expressly understood that the invention is not limited to bearings of the shoe, or Kingsbury type, but that various of its features may be embodied in any form of thrust bearing. Also, while the radial bearings have been shown as of the surface or shoe type, other forms of guide or journal bearings, such as roller or ball bearings may be used in many cases, and the term radial bearings is intended to embrace such form of bearings where suitable. Reference is therefore to be had to the appended claims for a definition of the limits of the invention.

What is claimed is:

1. In an apparatus of the class described, a shaft, a spherical thrust bearing for said shaft including a thrust base ring, means supplying lubricant for said thrust bearing, an auxiliary radial bearing for said shaft supplied with lubricant from said lubricating means and normally inactive as a radial bearing but maintaining an oil film between the radial bearing surfaces and acting to maintain said shaft centralized upon separation of the spherical surfaces of said thrust bearing, and means on said base ring for supporting the elements of said radial bearing in operative position about said shaft and in unitary relationship with said thrust bearing.

2. In apparatus of the class described, a shaft, a spherical thrust bearing for said shaft including a thrust base ring, means supplying lubricant for said thrust bearing, a supporting ring detachably mounted on said base ring, and an auxiliary radial bearing for said shaft supported by said supporting ring and supplied with lubricant from said lubricating means, said radial bearing being normally inactive as a radial bearing but acting to prevent lateral displacement of the shaft during such times as the normal centralizing action of said spherical thrust bearing is ineffective.

3. In apparatus of the class described, a shaft, a spherical thrust bearing for said shaft including a thrust base ring, means supplying lubricant for said thrust bearing, an auxiliary radial bearing for said shaft supplied with lubricant from said lubricating means, means mounted on said base ring for supporting the elements of said radial bearing in operative position about said shaft, whereby both said spherical and said radial bearings may be adjusted as a unit for aligning said shaft, and means for adjusting the position of said radial bearing independently of and with respect to said spherical bearing.

4. In apparatus of the class described, a shaft, a spherical thrust bearing for said shaft including a thrust base ring, means supplying lubricant for said thrust bearing, a supporting ring detachably mounted on said base ring, an auxiliary radial bearing for said shaft including tiltable bearing shoes supported by said supporting ring and supplied with lubricant from said lubricating means, and means for adjusting the position of said radial bearing independently of and with respect to said spherical bearing.

5. In apparatus of the class described, a shaft, a spherical thrust bearing for said shaft including cooperating bearing members having spherical surfaces of engagement, a thrust base ring, a supporting ring detachably mounted on said base ring, and an auxiliary radial bearing mounted on said ring and cooperating with a rotatable element of said spherical bearing, said radial bearing being normally inactive as a radial bearing but acting to restrain said shaft when said spherical bearing ceases to restrain said shaft radially.

6. In apparatus of the class described, a shaft, a spherical thrust bearing for said shaft including cooperating bearing members having spherical surfaces of engagement, a thrust base ring, a supporting ring detachably supported upon and above said base ring and surrounding a rotatable element of said spherical bearing, a plurality of recesses formed in said supporting ring, and auxiliary radial bearing elements housed in said recesses and cooperating with said rotatable element.

7. In apparatus of the class described, a shaft, a spherical thrust bearing for said shaft including a thrust base ring, a supporting ring detachably supported upon and above said base ring and surrounding a rotatable element of said spherical bearing, a plurality of recesses formed in said supporting ring, auxiliary radial bearing elements housed in said recesses and cooperating with said rotatable element, and means for adjusting the positions of said radial bearing elements with respect to the shaft independently of said spherical bearing.

8. In apparatus of the class described, a shaft, a spherical thrust bearing for said shaft including a thrust base ring, a plurality of circumferentially spaced recesses formed in the bore of said base ring, auxiliary radial bearing elements for said shaft respectively housed in said recesses, and cooperating with said shaft, and means extending through said base ring to the exterior thereof for adjusting said radial bearing elements.

9. In apparatus of the class described, a shaft, a spherical thrust bearing for said shaft including a thrust base ring, a recess formed in said base ring, an auxiliary radial bearing for said shaft housed in said recess and cooperating with said shaft, said radial bearing constituting a unit movable into and out of said recess, and means extending to the exterior of said base ring for adjusting the position of the radial bearing elements with respect to the shaft without movement of said base ring.

10. In apparatus of the class described, a shaft, a rotatable bearing element carried by the shaft and having a curved bearing surface, a stationary thrust receiving bearing element having a curved bearing surface mating with and normally in engagement with that of said rotatable element, means supplying lubricant for said thrust bearing surfaces, a thrust base ring on which said stationary element is mounted, an auxiliary radial bearing for said shaft supplied with lubricant from said lubricating means and normally maintaining an oil film between the radial bearing surface but inactive as a radial bearing, said radial bearing acting to prevent substantial lateral displacement of the shaft upon separation of the mating curved bearing surfaces of said rotatable and fixed elements, and means unitarily associated with said thrust base ring for housing and tiltably supporting the elements of said auxiliary radial bearing in operative position.

11. In apparatus of the class described, a shaft, a rotatable bearing element carried by the shaft and having a curved bearing surface, a stationary thrust receiving bearing element having a curved bearing surface mating with and normally in engagement with that of said rotatable element, a thrust base ring on which said stationary element is mounted, an auxiliary radial bearing cooperating with said rotatable bearing element and maintaining a clearance therewith to establish thick oil films but normally remain inactive as a radial bearing including a plurality of circumferentially spaced, tiltably mounted shoes, and means unitarily associated with said thrust base ring for supporting said radial bearing shoes in operative position.

12. In apparatus of the class described, a shaft, a rotatable bearing element carried by the shaft and having a curved bearing surface, a stationary thrust receiving bearing element having a curved bearing surface mating with and normally in engagement with that of said rotatable element, a thrust base ring on which said stationary element is mounted, an auxiliary radial bearing for said shaft normally inactive as a radial bearing but acting as a radial bearing to prevent lateral displacement thereof upon separation of the mating curved bearing surfaces of said rotatable and fixed elements, and means unitarily associated with said thrust base ring for supporting the elements of said auxiliary radial bearing in bearing relation with the periphery of the same rotatable bearing element with which said stationary thrust receiving bearing element is normally in engagement.

13. In apparatus of the class described, a shaft, a rotatable bearing element carried by the shaft and having a curved bearing surface, a stationary thrust receiving bearing element having a curved bearing surface mating with and normally in engagement with that of said rotatable element, a thrust base ring on which said stationary element is mounted, an auxiliary radial bearing for said shaft including a plurality of tiltably mounted shoes, and a supporting ring detachably mounted on said thrust base ring in which said shoes are housed and supported in position to have bearing engagement with the periphery of the same rotatable bearing element with which said stationary thrust receiving bearing element is normally in engagement upon separation of said curved bearing surfaces.

14. In apparatus of the class described, a shaft, a rotatable bearing element carried by the shaft and having a curved bearing surface, a stationary thrust receiving bearing element having a curved bearing surface mating with and normally in engagement with that of said rotatable element, a thrust base ring on which said stationary element is mounted, an auxiliary radial bearing for said shaft including a plurality of tiltably mounted shoes, said base ring providing a recess in which said shoes are mounted, and means mounted in said recess and providing a unit movable with and separately from said thrust base ring for supporting said radial bearing shoes in bearing engagement with the periphery of the shaft itself.

15. In apparatus of the class described, a shaft, a rotatable bearing element carried by the shaft and having a curved bearing surface, a stationary thrust receiving bearing element having a curved bearing surface mating with and normally in engagement with that of said rotatable element, a thrust base ring on which said stationary element is mounted, an auxiliary radial bearing for said shaft including a plurality of tiltably mounted shoes, said shoes having a large running clearance with said rotatable element, a supporting ring detachably mounted on said thrust base ring in which said shoes are housed and supported, and jackscrew means carried by said supporting ring for adjusting said shoes independently of and with respect to the thrust bearing elements.

16. In apparatus of the class described, a shaft, a spherical thrust bearing for said shaft including relatively rotatable spherical bearing members and a thrust base ring having an enlarged bore, a supporting ring detachably mounted within said bore and cooperating with the stationary bearing members to retain the same in operative position, and an auxiliary radial bearing for said shaft supported by said supporting ring.

17. In apparatus of the class described, a shaft, a spherical thrust bearing for said shaft including relatively rotatable spherical bearing members and a thrust base ring having an enlarged bore, a supporting ring detachably mounted within said bore and cooperating with the stationary bearing members to retain the same in operative position, an auxiliary radial bearing for said shaft supported by said supporting ring, and means for adjusting the position of said radial bearing with respect to said shaft from outside of said base ring.

18. In apparatus of the class described, a shaft, a spherical thrust bearing for said shaft including a thrust base ring having an enlarged bore, a supporting ring housed within said bore, a tie ring detachably connected to both said supporting ring and said base ring, and an auxiliary radial bearing for said shaft supported by said supporting ring.

19. In apparatus of the class described, a shaft having an enlarged flange, a spherical thrust bearing for said shaft including a thrust base ring and a thrust receiving bearing element partially supported in said base ring, said base ring having an enlarged bore of a diameter greater than that of said flange whereby said shaft may be moved vertically through said base ring without disassembly thereof, and a bearing supporting ring detachably connected to said base ring in position to assist in the support of said thrust receiving bearing element.

20. In apparatus of the class described, a shaft having an enlarged flange, a spherical thrust bearing for said shaft including a thrust base ring and a thrust receiving bearing element partially supported in said base ring, said base ring having an enlarged bore of a diameter greater than that of said flange whereby said shaft may be moved vertically through said base ring without disassembly thereof, an auxiliary bearing supporting ring detachably connected to said base ring in position to assist in the support of said thrust receiving bearing element, a supporting ring detachably supported upon and above said base ring and surrounding a rotatable element of said spherical bearing, and an auxiliary radial bearing for said shaft supported by said supporting ring.

21. In apparatus of the class described, a shaft having an enlarged flange, a spherical thrust bearing for said shaft including a thrust base ring and a thrust receiving bearing element partially supported in said base ring, said base ring having an enlarged bore of a diameter greater than that of said flange whereby said shaft may be moved vertically through said base ring without disassembly thereof, a supporting ring detachably mounted within said bore and assisting in the support of said thrust receiving bearing element, and an auxiliary radial bearing for said shaft supported by said base ring.

22. In a bearing for a vertical shaft, a plurality of bearing elements circumferentially spaced about the shaft, an oil reservoir within which said bearing elements are mounted with a substantial portion of their bearing surfaces above the normal level of the oil therein, and means cooperating with the periphery of a rotatable element in contact with the oil and having inclined oil deflecting surfaces radially aligned with said bearing surfaces for deflecting upwardly to the portions of said elements above the normal oil level a portion of the oil flow created by rotation of said shaft.

23. In a bearing for a vertical shaft, a plurality of bearing elements circumferentially spaced about the shaft, an oil reservoir within which said bearing elements are mounted with a substantial portion of their bearing surfaces above the normal level of the oil therein, and means for supplying oil to the portions of said elements above the normal oil level comprising oil deflector members mounted between adjacent bearing elements and having means to intercept the flow of oil created by rotation of the shaft and to deflect a portion of said flow upwardly to lubricate the upper portions of said elements.

24. In a bearing for a vertical shaft, a plurality of bearing elements circumferentially spaced about the shaft, an oil reservoir within which said bearing elements are mounted with a substantial portion of their bearing surfaces above the normal level of the oil therein, and means for supplying oil to the portions of said elements above the normal oil level comprising oil deflector members mounted between adjacent bearing elements and having means to intercept the flow of oil created by rotation of the shaft and to deflect a portion of said flow upwardly to lubricate the upper portions of said elements, each of said deflector members being symmetrically shaped so as to be operative for either direction of rotation of said shaft.

25. In a bearing for a vertical shaft, a plurality of bearing elements circumferentially spaced about the shaft, an oil reservoir within which said bearing elements are mounted with a substantial portion of their bearing surfaces above the normal level of the oil therein, and a plurality of oil deflector members mounted between adjacent bearing elements, each of said deflector members having a substantially horizontal intercepting portion lying below the bottom surface of the adjacent bearing elements and directed into the path of the flow of oil created by rotation of the shaft, and a diagonally upwardly extending deflecting portion along which the intercepted oil is directed until delivered at the upper end thereof substantially on a level with the upper surfaces of said bearing elements.

26. In a bearing for a vertical shaft, a plurality of bearing elements circumferentially spaced about the shaft, an oil reservoir within which said bearing elements are mounted with a substantial portion of their bearing surfaces above the normal level of the oil therein, and a plurality of oil deflector members mounted between adjacent bearing elements, each of said deflector members having an inverted V shape with the extremities thereof curved outwardly so as to intercept the flow of the oil created by rotation of the shaft and with the vertex thereof lying adjacent the level of the upper surfaces of said bearing elements whereby a portion of said oil flow is deflected upwardly to lubricate the upper portions of said elements regardless of the direction of rotation of said shaft.

27. In combination, a vertical shaft, a thrust bearing for said shaft including a thrust base ring, a radial bearing for said shaft detachably supported upon and above said base ring, an oil reservoir in which both said thrust and radial bearings are mounted, a substantial portion of the elements of said radial bearing lying above the normal level of the oil in said reservoir, and means cooperating with the periphery of a rotatable member in contact with the oil for automatically deflecting upwardly to said last named portions of the radial bearing a portion of the oil flow created within said reservoir by rotation of said shaft.

28. In combination, a vertical shaft, a thrust bearing for said shaft including a thrust base ring, a radial bearing for said shaft detachably supported upon and above said base ring, an oil reservoir in which both said thrust and radial bearings are mounted, a substantial portion of the elements of said radial bearing lying above the normal level of the oil in said reservoir, and means comprising a plurality of deflector members disposed between circumferentially spaced elements of said radial bearing for automatically deflecting upwardly to said last named portions of the radial bearing a portion of the oil flow created within said reservoir by rotation of said shaft.

29. In combination, a vertical shaft, a thrust bearing for said shaft including a thrust base ring, a radial bearing for said shaft detachably supported upon and above said base ring, an oil reservoir in which both said thrust and radial bearings are mounted, a substantial portion of the elements of said radial bearing lying above the normal level of the oil in said reservoir, and means for automatically deflecting upwardly to said last named portions of the radial bearing a portion of the oil flow created within said reservoir by rotation of said shaft, said means comprising a plurality of deflector members mounted between circumferentially spaced elements of said radial bearing, each of said members having a substantially horizontal intercepting portion lying below the bottom surface of the adjacent bearing element and directed into the path of said oil flow, and a diagonally upwardly extending deflecting portion along which the intercepted oil is directed until delivered at the upper end thereof substantially on a level with the upper portions of said radial bearing elements.

30. In combination, a vertical shaft, a thrust bearing for said shaft including a thrust base ring, a radial bearing for said shaft detachably supported upon and above said base ring, an oil reservoir in which both said thrust and radial bearings are mounted, a substantial portion of the elements of said radial bearing lying above the normal level of the oil in said reservoir, and means for automatically deflecting upwardly to said last named portions of the radial bearing a portion of the oil flow created within said reservoir by rotation of said shaft, said means comprising a plurality of deflector members mounted between circumferentially spaced elements of said radial bearing, each of said members having an inverted V shape with the extremities thereof curved outwardly so as to intercept said oil flow and with the vertex thereof lying adjacent the level of the upper portions of said radial bearing elements.

31. In a bearing for a vertical shaft, a rotatable bearing element carried by said shaft, a stationary bearing element associated with said rotatable element, an oil reservoir within which said stationary element is supported, means in said reservoir for preventing aeration of the oil within said reservoir comprising an air-seal ring mounted closely adjacent the periphery of said rotatable element and just above the normal oil level in said reservoir, said ring having an oil groove formed therein, and means for supplying oil under a positive pressure directly to said oil groove during rotation of said shaft.

32. In a bearing for a vertical shaft, a rotatable bearing element carried by said shaft, a stationary bearing element associated with said rotatable element, an oil reservoir within which said stationary element is supported, means in said reservoir for preventing aeration of the oil within said reservoir comprising an air-seal ring mounted closely adjacent the periphery of said rotatable element and just above the normal oil level in said reservoir, said ring having an oil groove formed therein, and means actuated by the rotation of said rotatable bearing element for supplying oil directly to said oil groove under a positive pressure.

33. In a bearing for a vertical shaft, a rotatable bearing element carried by said shaft, a stationary bearing element associated with said rotatable element, an oil reservoir within which said stationary element is supported, means for preventing aeration of the oil within said reservoir comprising an air-seal ring mounted closely adjacent the periphery of said rotatable element and just above the normal oil level in said reservoir, said ring having an oil groove formed therein, and means for supplying oil under a positive pressure to said oil groove during rotation of said shaft including a funnel-like member supported below the normal oil level and closely adjacent the periphery of said rotatable bearing element, with its open end directed into the flow of the oil created by rotation of said rotatable bearing element, and conduit means for delivering the oil intercepted by said funnel-like member to said oil groove.

34. In a bearing for a vertical shaft, an annular rotatable bearing element carried by said shaft, a stationary bearing element associated with said rotatable element, an oil reservoir within which said stationary element is supported, means for preventing aeration of the oil within said reservoir comprising an air-seal ring mounted closely adjacent the periphery of said rotatable element and above the normal oil level in said reservoir, said ring having an oil groove formed therein, and means for supplying oil under a positive pressure to said oil groove during rotation of said shaft, including a passageway extending through said rotatable element and leading from a point on the inner periphery thereof below the normal oil level to a point on the outer periphery thereof coplanar with said oil groove, said passageway acting as a centrifugal pumping device during rotation of said rotatable element.

35. In combination, a vertical shaft, a thrust bearing for said shaft including a rotatable bearing element carried by said shaft and a stationary thrust receiving bearing element associated with said rotatable element, a radial bearing for said shaft detachably supported upon and above said stationary thrust receiving bearing element, an oil reservoir within which said stationary element and said radial bearing are mounted, means for preventing aeration of the oil within said reservoir comprising an air-seal ring mounted upon said radial bearing closely adjacent the periphery of said rotatable element and just above the normal oil level of said reservoir, said ring having an oil groove formed therein, and means for supplying oil to said oil groove during rotation of said shaft including a scoop-like oil deflector member supported below said radial bearing with its open end closely adjacent the periphery of said rotatable bearing element and directed into the flow of the oil created by rotation thereof, and conduit means connecting said deflector member and said oil groove.

36. In combination, a vertical shaft, a thrust bearing for said shaft including an annular rotatable bearing element carried by said shaft and a stationary thrust receiving bearing element associated with said rotatable element, an oil reservoir within which said stationary element is supported and into which said rotatable element extends, and means for promoting circulation of the oil within said reservoir including a radial passageway extending through said annular rotatable element and delivering below the normal oil level within the reservoir, said passageway acting as a centrifugal pumping device during rotation of said annular rotatable element.

37. In combination, a vertical shaft, a thrust bearing for said shaft including an annular rotatable bearing element carried by said shaft and a stationary thrust receiving bearing element associated with said rotatable element, an oil reservoir within which said stationary element is supported and into which said rotatable element extends, and means for promoting circulation of the oil within said reservoir including a radial passageway extending through said annular rotatable element from a point on its inner periphery below the normal level of the oil in said reservoir upwardly and outwardly to a point on its outer periphery below the normal level of the oil in said reservoir, said passageway acting as a centrifugal pumping device during rotation of said annular rotatable element.

38. In combination, a vertical shaft, a thrust bearing for said shaft including an annular rotatable bearing element carried by said shaft and a stationary thrust receiving bearing element associated with said rotatable element, an oil reservoir within which said stationary element is supported and into which said rotatable element extends, means for promoting circulation of the oil within said reservoir including a radial passageway extending through said annular rotatable element below the normal oil level within the reservoir, said passageway acting as a centrifugal pumping device during rotation of said annular rotatable element, and means for preventing aeration of the oil including a seal ring mounted closely adjacent the inner periphery of said annular rotatable element above the inner end of said radial passageway but below the normal oil level.

39. In combination, a vertical shaft, a thrust bearing for said shaft including an annular rotatable bearing element carried by said shaft and a stationary thrust receiving bearing element associated with said rotatable element, an oil reservoir within which said stationary element is supported and into which said rotatable element extends, means for promoting circulation of the oil within said reservoir including a radial passageway extending through said annular rotatable element below the normal oil level within the reservoir, said passageway acting as a centrifugal pumping device during rotation of said annular rotatable element, and means for preventing aeration of the oil comprising an air-seal ring mounted closely adjacent the outer periphery of said annular rotatable element and just above the normal oil level, said ring having an oil groove formed therein, and means for supplying oil to said oil groove during rotation of said shaft including a branch passageway from said radial passageway extending upwardly to a point on the outer periphery of said annular rotatable element at the level of said oil groove.

40. In combination, a vertical shaft, a thrust bearing for said shaft including an annular rotatable bearing element carried by said shaft and a stationary thrust receiving bearing element associated with said rotatable element, an oil reservoir within which said stationary element is supported and into which said rotatable element extends, means for promoting circulation of the oil within said reservoir including a radial passageway extending through said annular rotatable element from a point on the inner periphery thereof below the normal level of the oil in said reservoir upwardly and outwardly to a point on its outer periphery, said passageway acting as a centrifugal pumping device during rotation of said annular rotatable element, and means for preventing aeration of the oil at both the inner and outer peripheries of said annular rotatable element.

41. In combination, a vertical shaft, a thrust bearing for said shaft including an annular rotatable bearing element carried by said shaft and a stationary thrust receiving bearing element associated with said rotatable element, an oil reservoir within which said stationary element is supported and into which said rotatable element extends, means for promoting circulation of the oil within said reservoir including a radial passageway extending through said annular rotatable element from a point on the inner periphery thereof below the normal level of the oil in said reservoir upwardly and outwardly to a point on its outer periphery, said passageway acting as a centrifugal pumping device during rotation of said annular rotatable element, means for preventing aeration of the oil at the inner periphery of said annular rotatable element including a seal ring mounted closely adjacent the inner periphery of said element above the inner end of said radial passageway but below the normal oil level, means for preventing aeration at the outer periphery of said element comprising an air-seal ring mounted closely adjacent the outer periphery thereof and just above the normal oil level, said ring having an oil groove formed therein, and means for supplying oil to said groove during rotation of said shaft including a branch passageway from said radial passageway extending upwardly to a point on the outer periphery of said annular rotatable element at the level of said oil groove.

42. In a combined thrust and radial bearing, a rotatable bearing element carried by the shaft, stationary thrust and radial bearing elements cooperating with said rotatable element, an oil reservoir in which said stationary elements are mounted and into which said rotatable element extends, a cooling coil mounted within said reservoir, and means for circulating the oil through and from said reservoir in a plurality of different paths through both the thrust and radial bearing elements comprising a passageway for supplying a portion of the oil in the reservoir to the thrust bearing elements, a separate passageway for supplying another portion of the oil to said radial bearing elements, and a common return passageway from both the thrust and radial bearing elements to the reservoir.

43. In a combined thrust and radial bearing, a rotatable bearing element carried by the shaft, stationary thrust and radial bearing elements cooperating with said rotatable element, an oil reservoir in which said stationary elements are mounted and into which said rotatable element extends, a cooling coil mounted within said reservoir, and means for circulating the oil through and from said reservoir in a plurality of different paths through both the thrust and radial bearing elements comprising a passageway for supplying a portion of the oil in the reservoir to the thrust bearing elements, a separate passageway for supplying another portion of the oil to said radial bearing elements, and a common return passageway from both the thrust and radial bearing elements to the reservoir, said common return passageway being in substantially the same plane with a portion of the periphery of said rotatable bearing element lying between said stationary thrust and radial bearing elements.

44. In a combined thrust and radial bearing, stationary thrust and radial bearing elements axially spaced with respect to the shaft, a rotatable bearing element carried by the shaft and cooperating with both said stationary thrust and radial bearing elements, said rotatable element having a flange or shoulder portion lying between said thrust and radial bearing elements, an oil reservoir in which said stationary elements are mounted, a cooling coil mounted in said reservoir, and means for circulating the oil from said reservoir in a plurality of different paths through both said thrust and radial bearing elements comprising a passageway leading from said reservoir to the radial bearing elements above the flange or shoulder portion of said rotatable element, a separate passageway leading from said reservoir to the thrust bearing elements below said flange or shoulder portion, and a common return passageway to said reservoir lying in substantially the same plane with said flange or shoulder portion of said rotatable element.

45. In a combined thrust and radial bearing, stationary thrust and radial bearing elements axially spaced with respect to the shaft, a rotatable bearing element carried by the shaft and cooperating with both said stationary thrust and radial bearing elements, said rotatable element having a flange or shoulder portion lying between said thrust and radial bearing elements, an oil reservoir in which said stationary elements are mounted, a cooling coil mounted in said reservoir and having a horizontal baffle extending over the top thereof, and means for circulating the oil from said reservoir in a plurality of different paths through both said thrust and radial bearing elements comprising a passageway leading from said reservoir at a point above said horizontal baffle to the radial bearing elements above the flange or shoulder portion of said rotatable element, a separate passageway leading from said reservoir to the thrust bearing elements below said flange or shoulder portion, and a common return passageway to said reservoir lying in substantially the same plane with said flange or shoulder portion of said rotatable element and delivering the oil to the reservoir below said horizontal baffle.

46. In a combined thrust and radial bearing for a vertical shaft, stationary thrust bearing elements, stationary radial bearing elements mounted above said thrust bearing elements, a rotatable bearing element carried by the shaft and cooperating with both said stationary thrust and radial bearing elements, said rotatable element having a flange or shoulder portion lying between said thrust and radial bearing elements, an oil reservoir in which said stationary elements are mounted, and means for supplying oil from said reservoir to the radial bearing elements comprising a pasasgeway leading from said reservoir to the radial bearing elements at a level just above the flange or shoulder portion of said rotatable element, whereby the space around and between said radial bearing elements and said rotatable element is filled with oil, and a return passageway to said reservoir lying in substantially the same plane with the flange or shoulder portion of said rotatable element and thereby in position to receive the oil which is thrown outwardly by the centrifugal pumping action of the flange or shoulder portion of the latter.

47. In a combined thrust and radial bearing for a vertical shaft, stationary thrust bearing elements, stationary radial bearing elements mounted above said thrust bearing elements, a rotatable bearing element carried by the shaft and cooperating with both said stationary thrust and radial bearing elements, said rotatable element having a flange or shoulder portion lying between said thrust and radial bearing elements, an oil reservoir in which said stationary elements are mounted, a cooling coil mounted in said reservoir, and means for circulating oil through said reservoir and about said radial bearing elements comprising a baffle associated with said cooling coil, a passageway leading from said reservoir at a point on one side of said baffle to the radial bearing elements at a level just above the flange or shoulder portion of said rotatable element, whereby the space around and between said radial bearing elements and said rotatable element is filled with oil, and a return passageway to said reservoir lying substantially in the same plane with the flange or shoulder portion of said rotatable element and delivering the oil received to the reservoir on the other side of said baffle.

48. In a combined thrust and radial bearing for a vertical shaft, stationary thrust bearing elements, stationary radial bearing elements mounted above said thrust bearing elements, a rotatable bearing element carried by the shaft and cooperating with both said stationary thrust and radial bearing elements, said rotatable element having a flange or shoulder portion lying between said thrust and radial bearing elements, an oil reservoir in which said stationary elements are mounted, a cooling coil mounted in said reservoir, and means for circulating oil through said reservoir and about said radial bearing elements comprising a baffle associated with said cooling coil and including a horizontal portion above said coil and a vertical portion around the outside of said coil extending substantially the length thereof, a passageway leading from said reservoir at a point above said horizontal baffle to the radial bearing elements at a level just above the flange or shoulder portion of said rotatable element, whereby the space around and between said radial bearing elements and said rotatable element is filled with oil, and a return passageway to said reservoir lying in substantially the same plane with the flange or shoulder portion of said rotatable element and delivering the oil received to the reservoir below the horizontal portion and inside of the vertical portion of said baffle.

49. In a combined thrust and radial bearing for a vertical shaft, stationary thrust bearing elements, stationary radial bearing elements mounted above said thrust bearing elements, a rotatable bearing element carried by the shaft and cooperating with both said stationary thrust and radial bearing elements, said rotatable element having a flange or shoulder portion lying between said thrust and radial bearing elements, an oil reservoir in which said stationary elements are mounted, a cooling coil mounted in said reservoir, and means for circulating oil through said reservoir and about said radial bearing elements comprising a horizontal baffle extending over the top of said cooling coil, a passageway leading from said reservoir at a point above said horizontal baffle to the radial bearing elements at a level just above the flange or shoulder portion of said rotatable element, whereby the space around and between said radial bearing elements and said rotatable element is filled with oil, a return passageway to said reservoir lying in substantially the same plane with the flange or shoulder portion of said rotatable element and delivering the oil received to the reservoir below said horizontal baffle, and means mounted above said horizontal baffle and adjacent the entrance to said first named passageway for preventing aeration of the oil entering therein.

50. In a combined thrust and radial bearing for a shaft, a thrust base ring, radial bearing elements housed within the bore of said base ring, an oil well, an oil reservoir supported below said radial bearing elements, pumping means for continuously circulating oil from said reservoir to said radial bearing elements during rotation of the shaft, and passages for returning directly to said oil reservoir without passage through said oil well the oil circulating through the radial bearing elements.

51. In a combined thrust and radial bearing for a shaft, a thrust base ring, radial bearing elements housed within the bore of said base ring, an oil well, an oil reservoir supported below said radial bearing elements, oil distributing passageways formed in said base ring and respectively leading to said radial bearing elements and to said oil well, and pumping means for continuously and simultaneously supplying oil from said reservoir to both said passageways during rotation of the shaft.

52. In a combined thrust and radial bearing for a shaft, a thrust base ring, radial bearing elements housed within the bore of said base ring, an oil well, an oil reservoir supported below said radial bearing elements, oil distributing passageways formed in said base ring and leading to said radial bearing elements, pumping means for continuously supplying oil from said reservoir to said passageways during rotation of the shaft, and additional passageways for simultaneously circulating oil from said reservoir to the oil well and thence to the radial bearing elements.

53. In a combined thrust and radial bearing for a shaft, a thrust base ring, radial bearing elements housed within the bore of said base ring, an oil reservoir supported below said radial bearing elements, oil distributing passageways formed in said base ring and leading to the space between said base ring and the shaft just above said radial bearing elements, pumping means for continuously supplying oil from said reservoir to said passageways during rotation of the shaft, a seal ring closely surrounding said shaft just below said radial bearing elements for preventing further downward passage of oil along the shaft and maintaining said radial bearing elements immersed in oil, and additional passages leading from the space just above said seal ring for returning the oil direct to said reservoir.

54. In a bearing for a vertical shaft, a plurality of radial bearing elements circumferentially spaced about the shaft, a source of oil located below said elements, means for supplying oil from said source to said elements, and means for returning to said source the oil thus supplied, said last named means communicating with the bearing elements adjacent their lower ends and rising substantially to the level of their upper ends to maintain said bearing elements completely immersed in oil during rotation of the shaft.

55. In a bearing for a vertical shaft, a plurality of radial bearing elements circumferentially spaced about the shaft, a source of oil located below said elements, means for supplying oil from said source to said elements, seal means for limiting the downward passage of oil along the shaft, and means for returning to said source the oil thus supplied, said last named means communicating with the bearing elements adjacent their lower ends and rising substantially to the level of their upper ends and cooperating with said seal means to maintain said bearing elements completely immersed in oil during rotation of the shaft.

56. In a bearing for a vertical shaft, a plurality of radial bearing shoes circumferentially spaced about the shaft, a source of oil located below said shoes, means for supplying oil from said source to the inter-shoe spaces about the shaft, a seal ring closely surrounding the shaft below said shoes for limiting the downward passage of oil along the shaft, and means for returning to said source the oil thus supplied to said inter-shoe spaces, said last named means communicating with said inter-shoe spaces adjacent their lower ends and being operative only when the level of the oil in said inter-shoe spaces is substantially even with or above the upper surfaces of said shoes.

57. In a bearing for a vertical shaft, a plurality of radial bearing shoes circumferentially spaced about the shaft, an oil well, a source of oil located below said shoes, means for supplying oil from said source and from said oil well to the top of the inter-shoe spaces about the shaft, a seal ring closely surrounding the shaft below said shoes for limiting the downward passage of oil along the shaft, and conduit means for returning the oil from the bottom of said inter-shoe spaces, the uppermost portion of said conduit means being substantially level with the upper surfaces of said shoes whereby the latter are maintained completely immersed in oil during rotation of the shaft.

58. In apparatus of the class described, a vertical shaft, a thrust bearing for said shaft including a thrust base ring, an auxiliary radial bearing for said shaft including a plurality of tiltably mounted shoes, means unitarily associated with said thrust base ring for supporting said shoes in operative position about said shaft, and means for lubricating said shoes including a source of oil located below said shoes, means for supplying oil from said source to the inter-shoe spaces about the shaft, and means for returning to said source the oil thus supplied to said inter-shoe spaces, said return means communicating with said inter-shoe spaces adjacent their tops so as to maintain said shoes completely immersed in oil during rotation of the shaft.

59. In apparatus of the class described, a vertical shaft, a thrust bearing for said shaft including a rotatable bearing element carried by said shaft, a stationary thrust receiving bearing element and a thrust base ring on which said stationary element is mounted, said rotatable and stationary bearing elements having mating spherical bearing surfaces normally in engagement with one another, an auxiliary radial bearing for maintaining said shaft centralized upon separation of the spherical bearing surfaces of said thrust bearing, said radial bearing including a plurality of tiltably mounted shoes, means unitarily associated with said thrust base ring for supporting said shoes in operative position about said shaft, and means for lubricating said shoes including a source of oil located below said shoes, means for supplying oil from said source to the inter-shoe spaces about the shaft, and means for returning to said source the oil thus supplied to said inter-shoe spaces, said return means communicating with said inter-shoe spaces adjacent their tops so as to maintain said shoes completely immersed in oil during rotation of said shaft.

60. In a combined thrust and radial bearing for a shaft, a thrust base ring, thrust bearing elements supported on said base ring, a main oil reservoir in which said thrust base ring and bearing elements are housed, radial bearing elements housed within the bore of said base ring, an auxiliary oil reservoir supported below said radial bearing elements, and means for supplying oil from said auxiliary reservoir directly to both said radial bearing elements and said main oil reservoir.

61. In a combined thrust and radial bearing for a shaft, a thrust base ring, thrust bearing elements supported on said base ring, a main oil reservoir in which said thrust base ring and bearing elements are housed, radial bearing elements housed within the bore of said base ring, an auxiliary oil reservoir supported below said radial bearing elements, means for continuously supplying oil from said auxiliary reservoir to said radial bearing elements during rotation of the shaft, and means for simultaneously supplying oil from said auxiliary reservoir directly to said main reservoir.

62. In a combined thrust and radial bearing for a shaft, a thrust base ring, thrust bearing elements supported on said base ring, a main oil reservoir in which said thrust base ring and bearing elements are housed, radial bearing elements housed within the bore of said base ring, an auxiliary oil reservoir supported below said radial bearing elements, pumping means actuated by rotation of the shaft for lifting oil from said auxiliary reservoir, means for supplying a portion of the output of said pumping means to the radial bearing elements, and means for supplying the remainder of said output directly to the main oil reservoir.

63. In a combined thrust and radial bearing for a shaft, a thrust base ring, thrust bearing elements supported on said base ring, a main oil reservoir in which said thrust base ring and bearing elements are housed, radial bearing elements housed within the bore of said base ring, an auxiliary oil reservoir supported below said radial bearing elements, pumping means actuated by rotation of the shaft for lifting oil from said auxiliary reservoir, conduit means formed in said base ring for supplying a portion of the output of said pumping means sufficient to lubricate said radial bearing elements to the space between said base ring and shaft just above said elements, and additional conduit means for supplying directly to the main oil reservoir the excess output of said pumping means over that supplied by said first named conduit means.

64. In a combined thrust and radial bearing for a shaft, a thrust base ring, thrust bearing elements supported on said base ring, a main oil reservoir in which said thrust base ring and bearing elements are housed including an inner retaining wall surrounding the shaft, the normal level of the oil within said reservoir being substantially equal to the height of said inner wall, a cooling coil in said reservoir, radial bearing elements housed within the bore of said base ring, an auxiliary oil reservoir supported below said radial bearing elements, means for continuously supplying oil from said auxiliary reservoir to said radial bearing elements during rotation of the shaft for lubrication purposes, means for simultaneously supplying oil from said auxiliary reservoir to said main reservoir for cooling purposes, the addition of oil to said main reservoir by said last named means causing an overflow over said inner wall, and means for returning to said auxiliary reservoir both the overflow and the oil supplied to said radial bearing elements.

65. In a bearing for a shaft, a split rotatable bearing element carried by said shaft and having a substantially cylindrical peripheral surface, a stationary bearing element adapted to engage said surface, bolts for securing together the separable portions of said split bearing element, counterbores formed in the peripheral surface of said element to receive the heads of said bolts, and means for covering said counterbores and preserving the continuity of said cylindrical bearing surface of said element.

66. In a bearing for a shaft, a split rotatable bearing element carried by said shaft and having a substantially cylindrical peripheral surface, a stationary bearing element adapted to engage said surface, bolts for securing together the separable portions of said split bearing element, counterbores formed in the peripheral surface of said element to receive the heads of said bolts, a cover plate for each of said counterbores, and means for securing said cover plates to said split bearing element, each of said plates having an outer cylindrical surface of the same curvature as said split bearing element whereby the continuity of said cylindrical bearing surface of the latter is preserved.

67. In apparatus of the class described, a shaft, a rotatable bearing element carried by the shaft and having a pair of bearing surfaces, said element being split into a plurality of separable portions, bolts for securing together said separable portions, counterbores formed in one of the bearing surfaces of said element to receive the heads of said bolts, means for covering said counterbores to preserve the continuity of said bearing surface, a stationary thrust receiving bearing element adapted to engage one of said bearing surfaces, and an auxiliary radial bearing element adapted to engage the other of said bearing surfaces.

68. In apparatus of the class described, a shaft having an enlarged flange, a thrust bearing for said shaft including a thrust base ring and a thrust receiving bearing element partially supported in said base ring, said base ring having an enlarged bore of a diameter greater than that of said flange whereby said shaft may be moved through said base ring without disassembly thereof, an oil retaining sleeve surrounding said shaft and forming the inner wall of an oil reservoir in which said thrust bearing is mounted, means for securing said sleeve to said thrust base ring, and means carried by said sleeve for assisting in the support of said thrust receiving bearing element.

69. In a bearing for a shaft, a thrust block, a split rotatable bearing element carried by said block and having a substantially cylindrical peripheral surface, a stationary bearing element adapted to engage said surface, bolts for securing the separable portions of said bearing elements together, counterbores formed in the peripheral surface of said element to receive the heads of said bolts, means for covering said counterbores and preserving the continuity of said cylindrical bearing surface, and clamping elements for securing said bearing element to said thrust block, said clamping elements also engaging said covering means to prevent displacement thereof.

70. In apparatus of the class described, a shaft, a rotatable bearing element carried by said shaft and having a curved bearing surface, a stationary thrust receiving bearing element having a mating curved bearing surface normally in engagement with that of said rotatable element, an oil well in which said bearing surfaces are immersed, a thrust base ring on which said stationary element is mounted, an auxiliary radial bearing associated with said thrust bearing and adapted to prevent lateral displacement thereof upon separation of the mating curved bearing surfaces of said rotatable and stationary elements, and means unitarily associated with said thrust base ring and constituting a support for the elements of said auxiliary radial bearing, said last named means supporting said radial bearing elements in position to normally maintain a relatively thick oil film between the same and a rotatable member of said apparatus.

71. In apparatus of the class described, a shaft, a rotatable bearing element carried by said shaft and having a curved bearing surface, a stationary thrust receiving bearing element having a mating curved bearing surface normally in engagement with that of said rotatable element, an oil well in which said bearing surfaces are immersed, a thrust base ring on which said stationary element is mounted, an auxiliary radial bearing associated with said thrust bearing and adapted to prevent lateral displacement thereof upon separation of the mating curved bearing surfaces of said rotatable and stationary elements, and means unitarily associated with said thrust base ring and constituting a support for the elements of said auxiliary radial bearing, said last named means supporting said radial bearing elements in position to center said rotatable bearing element on separation from said stationary bearing element but with a clearance therefrom that is normally larger than a normal guide bearing clearance.

HARRY A. S. HOWARTH.